US005572672A

United States Patent [19]
Dewitt et al.

[11] Patent Number: 5,572,672
[45] Date of Patent: *Nov. 5, 1996

[54] METHOD AND APPARATUS FOR MONITORING DATA PROCESSING SYSTEM RESOURCES IN REAL-TIME

[75] Inventors: Jimmie E. Dewitt, Georgetown; Timothy M. Holck, Austin; James H. Summers, Round Rock; Samuel L. Emrick, Austin, all of Tex.

[73] Assignee: International Business Machines Corporation, Armonk, N.Y.

[*] Notice: The term of this patent shall not extend beyond the expiration date of Pat. No. 5,463,775.

[21] Appl. No.: 500,656

[22] Filed: Jul. 12, 1995

Related U.S. Application Data

[63] Continuation of Ser. No. 263,153, Jun. 20, 1994, Pat. No. 5,463,775, which is a continuation of Ser. No. 713,484, Jun. 10, 1991, abandoned.

[51] Int. Cl.$^6$ .............................. G06F 12/00; G06F 13/00
[52] U.S. Cl. .................. 395/184.01; 395/431; 395/494; 395/497.02; 395/427; 395/821; 395/616; 364/550; 364/569; 364/DIG. 1; 364/238.4; 364/242.4; 364/251.3; 364/252
[58] Field of Search ............................... 395/184.01, 431, 395/494, 497.02, 427, 821, 600; 364/550, 569, DIG. 1

[56] References Cited

U.S. PATENT DOCUMENTS

| | | | |
|---|---|---|---|
| 4,019,040 | 4/1977 | Thompson | 235/92 |
| 4,291,376 | 9/1981 | McCahill | 364/483 |
| 4,296,727 | 10/1981 | Bryan | 126/116 |
| 4,373,184 | 2/1983 | Lambregts | 364/434 |
| 4,459,656 | 7/1984 | Wilder, Jr. | 364/200 |
| 4,485,440 | 11/1984 | Duff et al. | 364/300 |

(List continued on next page.)

OTHER PUBLICATIONS

"General Purpose Data Collection Method", IBM TDB, vol. 16, No. 6, 11–73, pp. 1796–1798.
"Structure of Performance Monitor for Distributed Computer Systems", IBM TDB, vol. 20, No. 11B, Apr. 1978, pp. 5060–5065.
"Computer with Intergral Function Monitor", IBM TDB, vol. 10, No. 11, Apr. 1968, pp. 1700–1703.
"Performance Evaluator for Operating System", IBM TDB, vol. 16, No. 1, Jun. 1973, pp. 110–118.
"General Trace Facility", IBM TDB, vol. 15, No. 8, Jan. 1973, pp. 2446–2448.
"Definition and Measurement Method of 'Working Set' When Analyzing Memory Utilization in OS/2," IBM TDB, vol. 33, No. 2, Jul. 1990, p. 186.

(List continued on next page.)

*Primary Examiner*—Thomas G. Black
*Assistant Examiner*—Jean R. Homere
*Attorney, Agent, or Firm*—Wayne P. Bailey; Richard A. Henkler

[57] ABSTRACT

A graphical system resource monitor is provided to depict, in real-time, a data processing system's internal resource utilization. A window or viewport of a data processing system displays user specified internal system resources, such as memory, CPU, or peripheral device availability/utilization. This graphical representation of the 'state' of the data processing system's resources is maintained in real-time, while the impact on the system's performance in providing such information is kept to a minimum. This is accomplished through a combination of various techniques, including specialized device drivers for the respective devices coupled with a unique data reduction technique. The graphical results of these resource monitors are continually updated in real-time. This real-time support provides an immediate and accurate representation of the internal operations of the data processing system. Further, these resources can be monitored at the process level of a multiprocessing system. These representations can be used by a user to identify, isolate, and fine-tune the data processing system's resources to improve the overall efficiency of the system being monitored.

11 Claims, 10 Drawing Sheets

Diagram for "Technique for Measuring Peripheral Device Utilization"

U.S. PATENT DOCUMENTS

| | | | |
|---|---|---|---|
| 4,499,539 | 2/1985 | Vosacek | 395/600 |
| 4,533,910 | 8/1985 | Sukonick et al. | 340/721 |
| 4,533,997 | 8/1985 | Furgerson | 364/200 |
| 4,590,550 | 5/1986 | Eilert et al. | 364/200 |
| 4,660,130 | 4/1987 | Bartley et al. | 395/419 |
| 4,701,848 | 10/1987 | Clyde . | |
| 4,821,178 | 4/1989 | Levin et al. | 364/200 |
| 4,823,290 | 4/1989 | Fasack et al. | 364/550 |
| 4,878,183 | 10/1989 | Ewart | 364/227 |
| 4,905,171 | 2/1990 | Kiel et al. | 364/551.01 |
| 4,937,743 | 6/1990 | Rassman et al. | 364/401 |
| 5,081,577 | 1/1992 | Hatle | 364/200 |
| 5,153,837 | 10/1992 | Shaffer et al. | 395/325 |
| 5,167,030 | 11/1992 | Spilo | 395/700 |
| 5,214,772 | 5/1993 | Weinberger et al. | 395/575 |
| 5,237,681 | 8/1993 | Kagan et al. | 395/600 |
| 5,241,672 | 8/1993 | Slomcenski et al. | 395/600 |
| 5,265,252 | 11/1993 | Rawson, III et al. | 395/700 |
| 5,359,713 | 10/1994 | Moran et al. | 395/200 |
| 5,463,775 | 10/1995 | Dewitt et al. | 395/184.01 |

OTHER PUBLICATIONS

"Software Tool for Reducing Page Fault Frequency", IBM TDB, vol. 32, No. 5B, Oct. 1989, pp. 464–466.

"Performance Monitor of Small Remote Computer Systems", IBM TDB, vol. 19, No. 6, Nov. 1976, pp. 2386–2388.

"Memory Usage Estimator", IBM TDB, vol. 16, No. 1, Jun. 1973, pp. 284–285.

"Functional Working Sets", IBM TDB, vol. 19, No. 4, Sep. 1976, pp. 1363–1364.

"Working Set Determination", vol. 26, No. 9, Feb. 1984, p. 4761.

"Working–Set Coprocessor", IBM TDB, vol. 32, No. 4A, Sep. 1989, pp. 240–242.

"Memory Utilization Monitor", IBM TDB, vol. 15, No. 5, Oct. 1972, pp. 1709–1712.

"The OSRM2 System", OS/2 Resource Monitor System, Version 1.1, Copyright 1989–1990, C.O.L. Consulting Ltd.

"Monitoring Distributed Embedded Systems" by Ray Ford, 1990 pp. 237–244.

| Menu item | Action |
|---|---|
| Time Periods | Displays the Time periods dialog box. |

Time periods

Viewing period 240 seconds — 122
Sampling period 5 seconds — 122
RAM working set
Working set period 60 seconds — 122
— 120

OK   Cancel   Help

The Time Periods dialog box lets the user specify times that data will be collected and displayed.

Diagram for "Technique for Measuring Peripheral Device Utilization"

| SPM/2 Trace Pipe Records | | | |
|---|---|---|---|
| Record Description (Resource) | Trace Pipe Code | Data | Size |
| Process Info (CPU) | 01 | Process ID | Word |
| | | Process name | ASCIIZ string |
| Process Switch (CPU) | 02 | Process ID (of dispatched process) | Word |
| | | Time executing previous process (timertics) | Doubleword |
| | | Time in interrupts previous process (timertics) | Doubleword |
| Time of Day (no type) | 10 | Hour | Byte |
| | | Minutes | Byte |
| | | Seconds | Byte |
| | | Reserved | 1 Byte |
| | | Time since last time of day record (timertics) | Doubleword |
| | | Day | Byte |
| | | Month | Byte |
| | | Year | Word |

FIG. 13A

| SPM/2 Trace Pipe Records | | | |
|---|---|---|---|
| Record Description (Resource) | Trace Pipe Code | Data | Size |
| System Info (no type) | 12 | Number of physical disks | Word |
| | | ID of first physical disk | Word |
| | | Total RAM installed (bytes) | Doubleword |
| | | Reserved | 22 Bytes |
| RAM (RAM) | 13 | Total swappable/ discardable RAM (bytes) | Doubleword |
| | | RAM in working set (bytes) | Doubleword |
| | | RAM not in working set (bytes) | Doubleword |
| | | Free RAM | Doubleword |
| | | Working set period | Doubleword |
| TRACECMD (no type) | 17 | Reserved | Byte |
| Data Overflow (no type) | 18 | Reserved | 4 Bytes |
| Disk Read (physical disk) | 21 | Physical disk ID | Word |
| | | Elapsed time (timertics) | Doubleword |
| | | Number of sectors | Word |
| Disk Write (physical disk) | 22 | Physical disk ID | Word |
| | | Elapsed time (timertics) | Doubleword |
| | | Number of sectors | Word |

FIG. 13B

| SPM/2 Trace Pipe Records | | | |
|---|---|---|---|
| Record Description (Resource) | Trace Pipe Code | Data | Size |
| Disk Write Verify (physical disk) | 23 | Physical disk ID | Word |
| | | Elapsed time (timertics) | Doubleword |
| | | Number of sectors | Word |
| DOS Open (logical disk) | 24 | Process ID | Word |
| | | File spec | ASCIIZ string |
| | | File handle | Word |
| DOS Read (logical disk) | 25 | Process ID | Word |
| | | File handle | Word |
| | | Number of bytes | Word |
| DOS Write (logical disk) | 27 | Process ID | Word |
| | | File handle | Word |
| | | Number of bytes | Word |
| DOS Close (logical disk) | 28 | Process ID | Word |
| | | File handle | Word |
| Swap In (swap) | 31 | Elapsed time (timertics) | Doubleword |
| | | Length of segment (bytes) | Doubleword |
| Swap Out (swap) | 32 | Elapsed time (timertics) | Doubleword |
| | | Length of segment (bytes) | Doubleword |
| Comment (no type) | 40 | Comment string (maximum size of 40 characters + null) | ASCIIZ string |

FIG. 13C

METHOD AND APPARATUS FOR MONITORING DATA PROCESSING SYSTEM RESOURCES IN REAL-TIME

This is a continuation of application Ser. No. 08/263,153 filed on Jun. 20, 1994, U.S. Pat. No. 5,463,775, which is a continuation of application Ser. No. 07/713,484 filed on Jun. 10, 1991, now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCES TO RELATED PATENT APPLICATIONS

"Method and Apparatus For Software Monitoring and Development", Ser. No. 07/458,045 and filed Dec. 17, 1989, now U.S. Pat. No. 5,121,501 assigned to same assignee as this application and hereby incorporated by reference.

"Real Time System Resource Monitor for Data Processing System with Support for Dynamic Variable Update and Automatic Bounding", application Ser. No. 07/713,471, now abandoned, filed Jun. 10, 1991 in the name of D. R. Gartner et al, hereby incorporated by reference.

"Real Time Internal Resource Monitor for Data Processing System", application Ser. No. 08/259,368, now pending, filed Jun. 10, 1991 in the name of D. A. Bishop et al, hereby incorporated by reference.

TECHNICAL FIELD

This invention relates to data processing systems and more particularly to a graphical monitor of a data processing system's resource utilization.

BACKGROUND ART

In the quest for continued improvements in efficiency and utilization of data processing systems, various types of data monitors have been developed to aid a user in understanding what is happening 'under the covers' of these systems. Data processing system resources of interest comprise such things as random access memory (RAM) usage, peripheral device usage, and central processing system (CPU) busy/idle time. These resources can give an operator of a data processing system key information on fine tuning the various system parameters to achieve a higher efficiency of the data processing system's overall throughput.

Users of operating systems need information on how much memory is being used. Information on memory utilization, especially memory Working Set, is useful for showing if the physical memory in the computer is sufficient for the currently active applications. Insufficient memory allocation can cause inefficient system operations due to excessive swapping or paging that can occur based on this insufficiency. Prior products analyzing system memory generally take on the order of 15–45 seconds to execute, depending on the actual amount of system memory exists in the system. The information presented is useful for determining the RAM consumed by an individual application, but only when intrusiveness of the tool, on the system being monitored, is not a factor. These prior products use a text screen. Other previously reported techniques and tools have relied on specialized hardware assistance for measuring or calculating RAM usage.

Other techniques have been used to measure other types of data processing system resources. Direct internal monitoring, by the system itself, is one technique known to exist. These techniques typically consume large percentages of the data processing system's own resources in capturing data, and write the captured data to some type of mass storage device. Then a subsequent procedure is used to read and analyze this data (i.e. analysis not in real time).

Device utilization for peripheral devices has historically been measured directly by precisely measuring the start-time and complete-time for each I/O (input/output). This allows a calculation of the individual I/O times. By summing these I/O times over a given period it was possible to calculate total busy time. Then, device utilization is calculated by dividing total busy time by total elapsed time. This approach creates two problems. First, it requires that the entity directly in control of the I/O (usually, either the device hardware and/or operating system) measure and record the I/O start/ stop times. Next, it requires a hardware timer with sufficient resolution to accurately time these I/O events. On some systems, for example personal computers, neither of these criteria are met. In other words, the hardware or operating system does not measure I/O time. Further, the hardware timer is of such poor resolution (32 milliseconds) in many of today's personal computers that accurate I/O timings cannot be made. Thus, for existing personal computer systems, device utilization is not obtainable using these conventional methods.

CPU idle time in a data processing system is the amount of time the computer s Central Processing Unit (CPU) is not being utilized by any task. Previous methods for measuring CPU idle time used a thread to perform a series of tasks. The number of tasks the thread performed was then compared with a hypothetical number of tasks that could have been performed, if the thread was allowed all available CPU time. This procedure is lacking in that the hypothetical number of tasks is different on different data processing systems. A system specific calibration algorithm is required to determine the minimum time the task(s) required to execute. This calibration method can be unreliable and presents many practical problems when moving between systems.

In general, the above types of systems are further lacking in that as performance data is gathered, it is written by the gathering system to a relatively slow mass storage device for further analysis. This is because the methods for capturing the data operate much faster than the methods used to analyze the data. Thus, the mass storage device is used as a buffer to allow the methods to operate at different operational speeds. Furthermore, the data generated by the data gathering system is of such a voluminous nature that the analysis method is unable to manage or maintain the large quantity of data. This constraint additionally required storage to an intermediate mass storage device.

As a result of this intermediate buffering, the analysis cannot be performed in real time, but rather is delayed. As such, any reports or other types of feedback of system performance and operation are chronically out of date with the actual performance. As today's data processing systems are supporting more complex operating environments, including support for multi-tasking and multi-users, this delay in performance data may cause critical system bottlenecks to continue unreported as the cause of any problem may have come and gone before being detected.

Other methods used to analyze the data require a significant amount of the gathering system's resources, such as the CPU. As a result, the analysis cannot be done in real time, as the analysis consumes such a large percentage of the resources, as it would bias the data to not be meaningful of the underlying system operation.

Some systems have attempted to overcome the above limitations, but in doing so have failed to maintain or capture information at a process level of a multi-processing system. Rather, overall system usage can be monitored, with no ability to focus on a particular process that may be causing the system to be performing poorly. This failure of process resolution results in showing that an overall system may be performing poorly, but no meaningful indication of which process in the system is the culprit.

DISCLOSURE OF THE INVENTION

This invention solves the above mentioned problems and deficiencies by providing a graphical display of user specified internal system resources, such as memory, CPU, or peripheral device availability/utilization in real time. This graphical representation of the 'state' of the data processing system's resources is maintained in real-time, while the impact on the system's performance in providing such information is kept to a minimum. This is accomplished through a combination of various techniques, including specialized device drivers coupled with unique data reduction techniques. This allows for information to be captured at a process granularity of a multiprocess system, and thus resources for a given process can be monitored. The graphical results of these resource monitors are conveniently presented to a user in a window or viewport of a data processing system display, and the data is updated in real-time. This real-time support provides an immediate and accurate representation of the operations of the data processing system. These representations can be used by a user to identify, isolate, and fine-tune the data processing system to improve the overall efficiency of the system being monitored.

For memory utilization, including RAM working set, an extremely efficient mechanism is used to compare Least Recently Used (LRU) timestamps by a device driver.

For peripheral device utilization measurements, such as disk drives or communication lines, the average amount of time that the peripheral device is busy is calculated. The methods utilized for this measurement do not require additional device firmware assistance, or precision timing hardware as were required by previous methods of obtaining device utilization information. Minimal operating system assistance is achieved by using hooks in the peripheral device drivers.

For CPU utilization, a process is assigned to the lowest priority, or idle, level of the processing system. The amount of time which this idle event is in operation represents the CPU idle time.

It is therefore an object of this invention to provide an improved resource monitor.

It is a further object of this invention to provide a resource monitor that operates in real time.

It is yet another object of this invention to provide a self-contained data processing system monitor that operates in real time.

It is yet another object of this invention to provide a self-contained data processing system process monitor that operates in real time.

BRIEF DESCRIPTION OF THE DRAWING

The foregoing and other objects, aspects and advantages of the invention will be better understood from the following Best Mode for Carrying Out the Invention with reference to the figures listed below, in which:

FIGS. 13A–13C detail the trace pipe records.

Appendix A-1 thru A-13 is sample C source code for interfacing to the API.

BEST MODE FOR CARRYING OUT THE INVENTION

OVERVIEW

The following method and system discloses a unique way to monitor a data processing system's resources, including RAM utilization, CPU idle time, and peripheral device utilization. This monitoring can be performed either internal to the system, or on a remote device attached via conventional communications methods. Various monitoring and tracing techniques are used for each respective resource being monitored. Data can be captured and presented at a process level in a multiprocessing environment. Other types of data processing system resources could be similarly monitored, such as data cache, using similar techniques of this invention, without departing from the claimed scope of this invention. The overall scheme is integrally packaged in an easy to use system, with real-time graphical depiction of resource parameters and support for user-modification of monitored variables. For purposes of the following discussion, it should be noted that 'real time'. is defined by Webster's New Collegiate Dictionary to mean 'the actual time in which an event takes place with the reporting on or recording of the event practically simultaneous with its occurrence.

Figure 1:
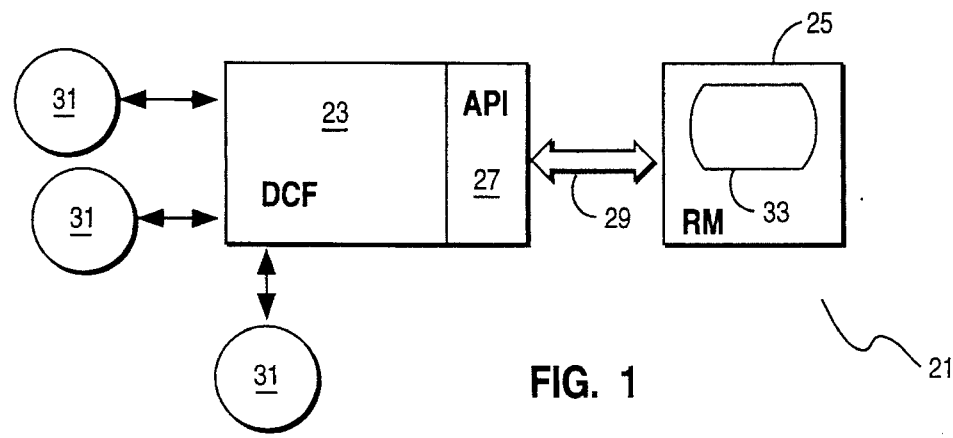
FIG. 1 shows the conceptual model of the system performance monitor.

Referring now to FIG. 1, the disclosed monitoring system 21 is conceptually divided into two distinct operations, a Data Collection Facility (DCF) 23 and a Resource Monitor (RM) 25. An application programming interface 27, or API, is used as the interface between these two operating models. A named pipe 29, as readily known to those of ordinary skill in the art and further described in "IBM OS/2 Programming Tools and Information, Version 1.2", and hereby incorporated by reference as background material, is used to establish the connection between the DCF 23 and RM 25. The DCF 23 collects key performance data for various resources 31 being tracked. The RM 25 provides a depiction of resource usage. In the preferred embodiment this depiction is displayed graphically on a conventional data processing system display 33. As a named pipe 29 is used, the system as shown can have the Data Collection Facility 23 running on a computer distinct from the computer running the Resource Monitor 25, when the systems are connected via conventional communications techniques. This is because using the named pipe allows for network transparent operation.

Figure 2:
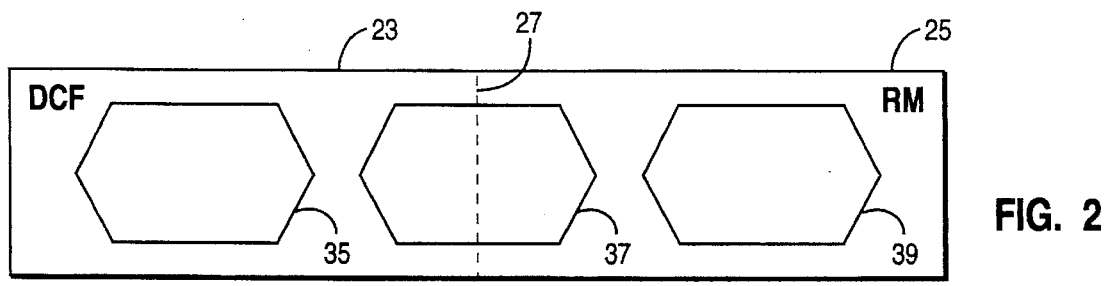
FIG. 2 shows the functional model of the system performance monitor.

Referring now to FIG. 2, this system 21 is functionally divided into three sub-categories of operations, which are data collection techniques 35, data reduction techniques 37, and presentation techniques 39. The data collection techniques 35 include RAM working set utilization and sampling of peripheral devices. The data reduction techniques 37 include measuring an idle thread to determine CPU idle time, filtering of trace data and other reduction methods. Finally, the presentation techniques 39 include dynamic monitoring and multi-viewport windowing. FIG. 2 further illustrates this functional representation being overlayed over the conceptual model of FIG. 1. As can be seen by FIG. 2, the data collection techniques 35 are fully contained within the Data Collection Facility 23. The data presentation techniques 39 are fully contained within the Resource Monitor 25. The data reduction techniques 37 are coexistent in both the Data Collection Facility 23 and the Resource Monitor 25. As will be subsequently shown, the sharing in responsibility for the data reduction techniques 37 allows for efficiencies in both data capture and ultimate graphical depiction of the resource being monitored. The particular methodologies for each resource being monitored in the preferred embodiment will now be described.

RAM UTILIZATION

One of the system resources 31 of FIG. 1 which can be monitored is RAM utilization. The disclosed monitoring method quickly (in milliseconds) calculates the memory utilization for an entire operating system. It displays the results graphically in real time. In the preferred embodiment, the operating system is the IBM OS/2[1] operating system, but these concepts could be readily adapted by one of ordinary skill in the art to any other type of computer operating system.

[1]Trademark of IBM Corp.

Figure 3:
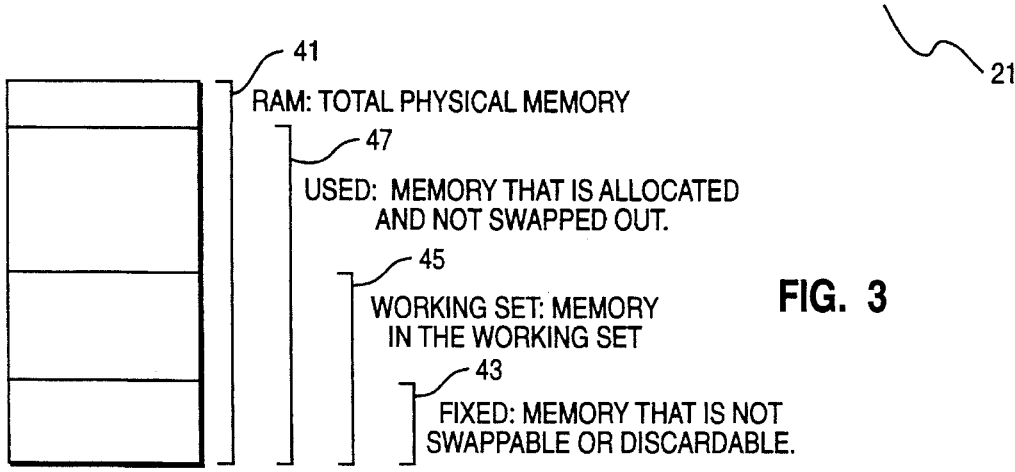
FIG. 3 shows the categories of system memory being monitored.

Referring now to FIG. 3, various categories of the total physical memory 41 are defined, with each respective category's utilization being graphically depicted. Fixed Memory 43 is memory in a segmented swapping memory scheme that cannot be swapped out or discarded. It remains allocated in RAM as long as the application that owns this memory is loaded. Working Set Memory 45 is defined as (i) all the memory segments which are not swappable nor discardable, and (ii) all the memory segments which are swappable/discardable and which are used during the execution of the applicable scenario. Used Memory 47 is RAM allocated by the system and present in physical memory (i.e. memory that is allocated and not swapped out). Working Set Memory is not an instantaneous value. It is the memory used over a period of time called the "Working Set Period". The Working Set Period may be dynamically changed, as described in the Dynamic Monitoring section.

To calculate the Working Set Memory 45 of the whole system, an enhanced device driver provides a very quick calculation of memory utilization. It uses a Working Set Period dynamically specified by the user. The device driver, which is coded in assembly language and runs at Ring O for best performance and uninhibited access to protected resources, obtains the Working Set for the whole system, not by session as was previously done in the prior art. Ring O will be known to those of ordinary skill in the art to be the ring running at the core level of an operating system, or most closest to the CPU hardware. Other levels, such as levels 1–3 in the preferred embodiment operating system of OS/2, run at respectively lower access levels of the CPU's internal resources.

Figure 4:
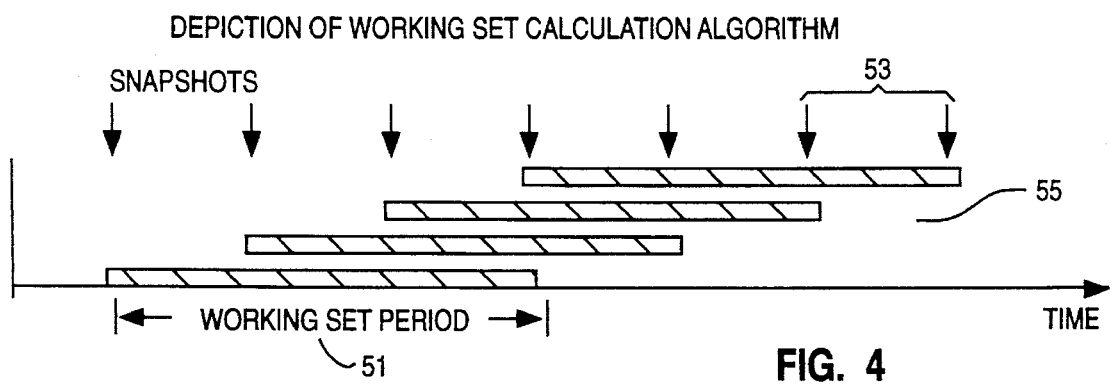
FIG. 4 depicts the working set calculation timing.

In reference to FIG. 4, the reported Working Set Memory is the percent of memory accessed over the last "Working Set Period" 51 seconds. It is updated, or snapshots are taken, every "Sampling Period" 53 seconds. This invention uses a sliding window 55 of memory use to calculate the Working Set Memory. The snapshot of memory taken every Sampling Period examines the Least Recently Used (LRU) timestamps for all memory segments (the methods for timestamping will be described later, in the device driver section). The LRU timestamps tell how recently a memory segment was accessed. For each snapshot, two values are found:

1. The latest LRU timestamp for the entire contents of memory. This value is the last time the most-recently-accessed part of memory was accessed. This value is used "Working Set Period" seconds later.
2. Which segments have been accessed since the LRU time stamp value that was saved "Working Set Period" seconds ago. The sum of the size of these segments comprises the Working Set 25 for that time period.

The procedure works as follows. The device driver walks through all the physical memory blocks. For each swappable, discardable block it does two comparisons:

1. Compares the block's LRU timestamp to the LRU timestamp acquired Working Set Period seconds earlier.
   — If the block's timestamp is greater than Working Set Period timestamp, then the block is in the Working Set, and the block size is added to the Working Set sum.
2. Compares the block's LRU timestamp to the maximum (newest) timestamp found thus far; if larger, it uses this new value for the current maximum timestamp.

The device driver returns the maximum (newest) LRU timestamp, the sum of the size (in bytes) of all the blocks in the Working Set, and the total physical memory.

Figure 5:
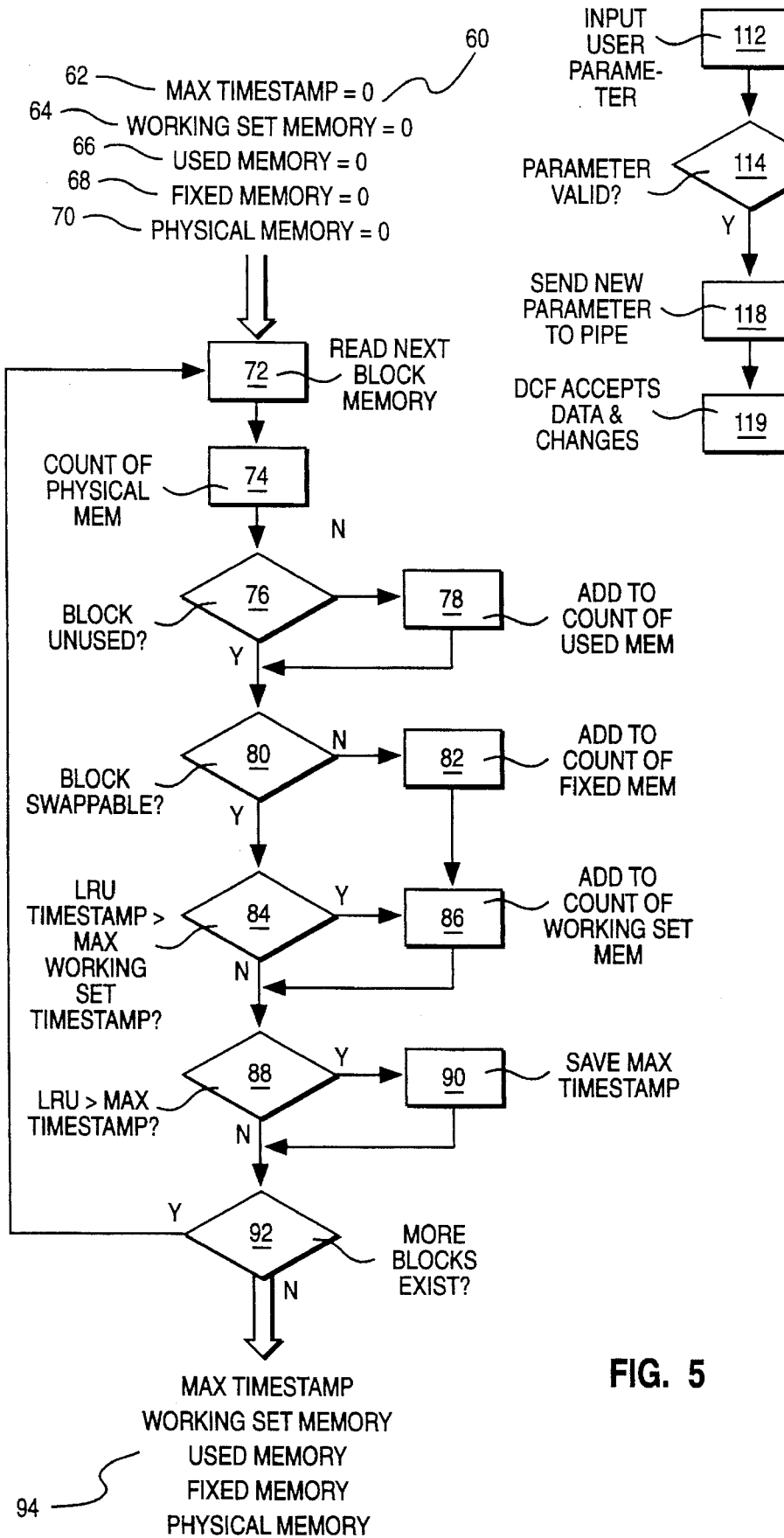
FIG. 5 shows the system memory usage algorithmic flow.

This procedure is depicted in more detail in FIG. 5. Various variables are initialized at 60. The next block of memory is read by the device driver at 72. The blocksize of memory being read is added to variable 70 which contains the count of Physical Memory at 74. A determination is made on whether the block is free, or unused, at 76. If not free, the blocksize is added to the variable 66 which contains the count of Used Memory at 78. Next, a determination is made on whether the block is swappable/discardable at 80. If not, the blocksize is added to the variable 68 which contains the count of Fixed Memory at 82. Additionally, since Fixed Memory is defined to be part of Working Set, the blocksize is also added to the variable 64 which contains the count of Working Set memory at 86. If the block is swappable/discardable, processing continues to 84 where a check of the block's LRU timestamp is made. If the block LRU timestamp is greater than the maximum Working Set Period timestamp, the blocksize is added to the variable 64 which contains the count of Working Set memory at 86. In either event, the next determination is made at 88 on whether the block's LRU timestamp is greater than MaxTimestamp 62. If it is greater, the block LRU timestamp is saved as the new MaxTimestamp 62 at 90. Finally, a check is made to see if more blocks exist at 92. If so, processing continues at 72. If not, the device driver returns at 94 the values for MaxTimestamp, Working Set memory, Used memory, Fixed memory, and Physical memory as defined in FIG. 3.

Figure 8:
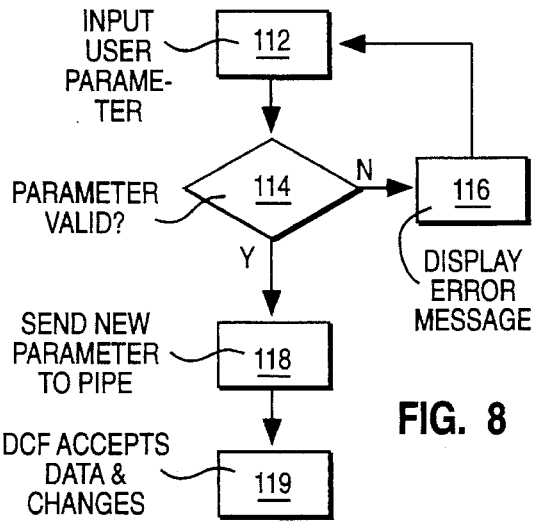
FIG. 8 shows the flow for accepting user input and updating parameters.

A graphics program, to be later described, invokes the device driver on a periodic basis, plotting the Working Set Memory as a percentage of the whole physical RAM in the user's machine. This invocation is achieved by the Data Collection Facility communicating via a system API call to the device. Information is then passed to the graphics program via the API over named pipes 29 of FIG. 1. Referring again to FIG. 3, the device driver is invoked every Sampling Period 53 to recalculate the Working Set Memory 45 (if the Working Set exceeds physical memory, it is displayed as 100%). As can be seen in FIG. 8, a typical Sampling Period is 5 seconds and a typical Working Set Period is 60 seconds.

Figure 6:
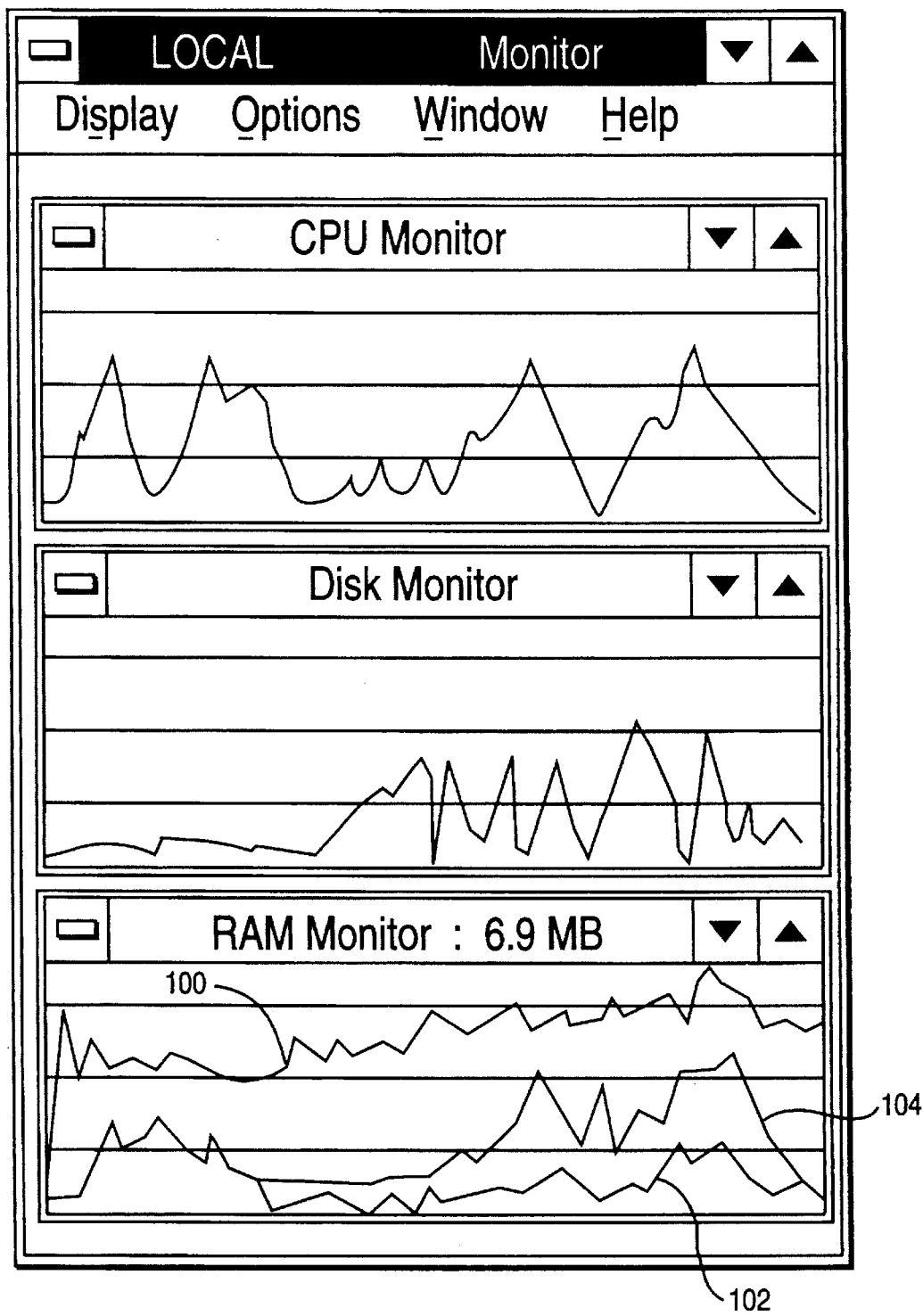
FIG. 6 shows a graphical representation of system resources being measured.

Referring now to FIG. 6, Fixed and Used Memory are graphed as the upper 100 and lower 102 bounds, respectively, of the Working Set Memory. Since the Working Set Memory 104 is never less than the Fixed Memory nor more than the Used Memory, the graph shows the possible range of the Working Set Memory. This feature assists a user in providing a self-calibration mechanism such that the absolute possible minimum and maximum values are depicted on the graph automatically. The minimum absolute value is the computed value of Fixed memory, and the maximum absolute value is the computed value of Used memory.

For a stable scenario, if the Working Set Period is decreased, the reported Working Set will be lower because less memory is typically accessed over shorter periods of time. If the Working Set Period is increased, the Working Set is higher because more memory for more applications is typically accessed over longer periods of time.

The value of the Working Set Period parameter can affect the reported Working Set Memory. Longer periods cause the Working Set Memory to approach Used Memory, or the upper limit. Shorter periods cause Working Set Memory to approach Fixed Memory, or the lower limit. Fixed and Used memory are instantaneous values. Working Set, however, is defined as memory used over a period of time.

The following Table 1 describes how the RAM monitor can be used to interpret system resources.

TABLE 1

RAM Monitor Scenario Interpretation

| Scenario | Interpretation |
| --- | --- |
| Note: | The Working Set Period is set to 60 seconds for all scenarios. |
| A large application is loaded. The working set shows a big increase. The fixed memory shows a small increase. The user decides not to use the application for a while, and a minute later the working set drops back down. | The loaded program is reported as part of the working set, and its fixed memory is reported as part of the system fixed memory (also included in the working set). For 60 seconds the memory used loading the program continues to be reported in the working set. Because the application is not active during the 60 seconds (and therefore most of the application's memory is not accessed), the working set drops back down after a minute even though the program is still loaded. The application's fixed memory, however, is still reported as part of the working set and as part of fixed memory. |
| A large application is loaded. The working set shows a bigger increase than expected. | This application probably uses more memory than it will during normal operation. The reported working set may drop later during normal operation. |
| A large application is loaded but then immediately ended. The reported working set rises and falls quickly. | When OS/2 unloads the application, OS/2 frees the application's memory. Freed memory is not reported in working set. |
| The swap-in and swap-out graphs show quite a bit of activity, even though the working set is not 100% | When new segments must be swapped in or loaded, old segments that have not been accessed recently may need to be swapped out or discarded. The memory swapped out was reported in the working set if it was last accessed more than 60 seconds ago. Even with occasional swap activity, there may still be enough memory for good performance. More physical memory is not necessarily needed. |
| When the OS/2 system and the SPM application first start, fixed memory is higher than anticipated. | The fixed memory may include a large VDISK or DISKCACHE as as defined in the CONFIG.SYS file. |
| For a stable scenario, the working set period is changed from 60 seconds to 10 seconds. The reported working set is now lower. | The working set is lower because less memory is typically accessed in 10 seconds than in 60. |
| For a stable scenario, the working set period is changed from 60 seconds to 1000 seconds. The reported working set is now higher. | The working set is higher because more memory for more applications is typically accessed in 1000 seconds than in 60 seconds. |

This information on memory utilization, especially the Working Set Memory, is useful for showing if the physical memory in the computer is sufficient for the currently active applications. This technique further allows a user to ask 'what if?' questions without actually resetting the parameters that affect the variable or entity in question. In summary, this technique quickly calculates the Random Access Memory (RAM) utilization for an operating system as a whole, including the Working Set, Fixed, and Used amounts of RAM and displays these results graphically.

DYNAMIC MONITORING

Figures 7A, 7B:
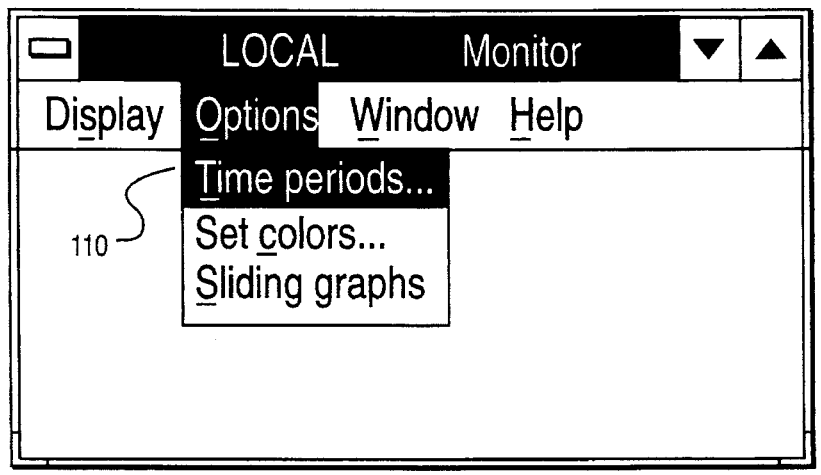
FIG. 7a–7b shows the use of a viewport menus.

The procedure for allowing a data processing system user to vary parameters that affect the display of dynamic monitors on a display screen will now be described. This procedure concerns the control of dynamic monitoring of a time-related function on a data processing system display when the function is affected by at least one variable. The data being monitored varies depending upon how certain parameters are set. As shown in FIG. 7b, a dialogue box is presented to a user on the display screen, which the user has selected from the window's menu or action bar 110 as shown in FIG. 7a. This dialogue box 120 contains fields 122 in which the user can enter new values of the parameters. After the user types in new, or modified, parameters, the program dynamically modifies the underlying function to use the new parameter's value. This is accomplished via an API call by the program controlling the dialogue box to the program controlling the data collection. As shown in FIG. 8, a user parameter is queried at 112 via a dialogue box on the screen of FIG. 7b. A check is made at 114 to determine if the parameter is valid. If not valid, an error message is displayed at 116 and the user parameter is again queried at 112. If valid, the new parameter is sent via a named pipe (29 of FIG. 1) to the Data Collection Facility API at 118. The Data Collection Facility accepts data and changes the parameter of the specified function at 119.

Although the preferred embodiment uses a dialogue box, other types of controls could similarly be used to obtain new parameters from a user, such as scroll bars, spin buttons, entry fields or command line parameters.

This method for varying parameters is used to modify the above-described RAM Working Set Period, the parameter which affects the dynamic display of the RAM Working Set Memory on the RAM Monitor window. As was previously discussed, the RAM Working Set Memory usually becomes lower when the user selects a lower RAM Working Set Period, and higher when selects a higher RAM Working Set Period.

PERIPHERAL DEVICE UTILIZATION

The general technique used for determining device utilization does not require high-resolution timing or changes to the hardware and/or operating system. Rather, this method periodically samples the device's status and records the number of times that the device returns a 'device busy' status. The technique used for generating the periodic rate can vary from implementation to implementation, and is not specific or critical to understanding the underlying device utilization measurement technique. For example, on a personal computer it is convenient to use the hardware timer interrupt, which occurs every 32 milliseconds on an IBM Personal Computer running OS/2, and every 55 milliseconds when running DOS. Further, the technique used to query device status will vary from device to device, but is similarly extendable to other types of devices without departing from the spirit and scope of the present invention. For example, an IBM Personal Computer ESDI disk drive provides continuous status at input port address x'3512' (hex). Other devices require that a device query command be sent to the device before before the device returns status information.

Figure 9:
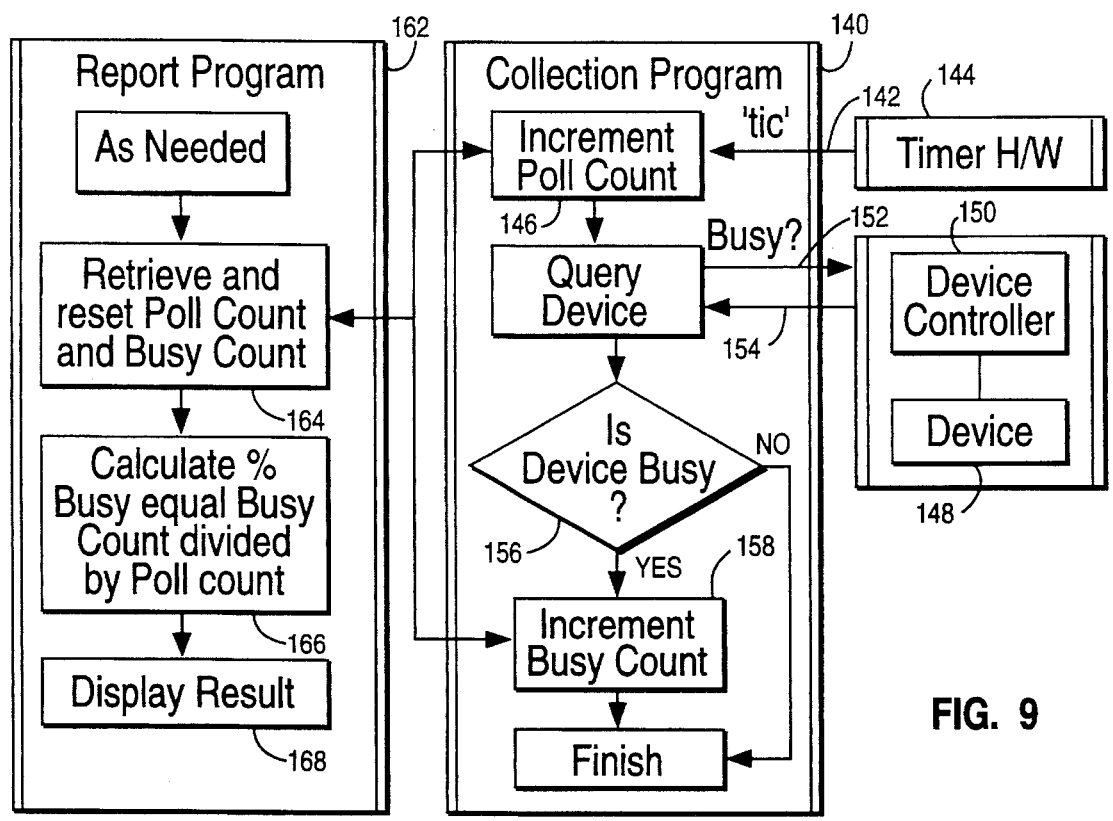
FIG. 9 shows how peripheral device utilization is measured.

Referring now to FIG. 9, the collection program 140, which is a device driver in the preferred embodiment, receives interrupts 142 from a hardware timer 144. Each timer 'tic' causes the poll count to be incremented at 146. Then, the device 148 being measured is queried at 152, through its associated device controller 150 to determine if the device 148 is busy or not. This busy information is reported at 154 by the device controller 150. A check is made at 156 to see if the device reported a busy status. If so, the Busy Count is incremented at 158, and the collection ends until triggered again by a tic 142.

Once the collection program has a sufficient number of samples, as determined by the user specified or default parameters, the reporting program 162 then gathers the busy and total counts at 164, and calculates device utilization at 166 by dividing the busy count by the total count. This calculation is shown as follows:

Device Utilization=Busy Count/Total Count

This utilization number can then be reported by any number of methods, such as written to the display at 168 in either numeric or graphical form as hereinafter described, or written to a log file. This report program periodically invokes the collection program device driver, and plots the ratio of the number of busy tics to the total number of tics 142 as a ratio, in the preferred embodiment. The device driver is invoked every one second to recalculate the device utilization, although the frequency of this invocation is user-defined and modifiable by the procedures described elsewhere in this preferred embodiment description.

Because device utilization is being estimated by sampling, rather than measured directly, there is potential for error in the estimate. Statistical methods can predict this potential error. As will be readily understood by those of skill in the art, the sampling technique above uses repeated samples that have only two possible values, busy or not busy. Such samples are called Bernouli samples, and follow the Binomial Distribution. Further, if the number of samples is relatively large, say greater than 20, then the Binomial Distribution may be approximated by the Normal Distribution. For the Normal Distribution, the error in the sample percentage as compared to the actual percentage is less than:

$$\text{Error}=Z(a/2)*(x/n*(1-x/n)/n)^{**1/2} \text{ where:}$$

a=Desired confidence level (typically 0.95 or 0.99)

Z=Standard random variable for Normal Distribution x='Successful' number of samples (in this case, busy samples)

n=Total number of samples

The value for Z(a/2) is found in statistical tables. For a 95% confidence, Z(a/2) equals 1.960. For a 99% confidence, Z(a/2) equals 2.576.

As a specific example, consider that on an IBM Personal Computer running OS/2 a total of 10*1/0.032=312 samples can be collected in 10 seconds. Further, consider that the largest value that the (x/n*(1−x/n)) can attain is 0.25 when the x is exactly one-half of n (This assertion can be proved by elementary calculus). One can then assert with 95% confidence that the maximum error found in a ten second device utilization estimate does not exceed:

$$1.96*(0.25/312)^{**1/2}=0.055=5.5\%$$

A similar calculation would show that the maximum error in a one minute sample would be 2.3%. Thus, statistics show that the device busy sampling method described above does provide good accuracy in estimating device utilization. Further, this method is simpler and less expensive than previous used methods in obtaining device utilization information.

An alternative method of measuring peripheral device utilization is as follows. For measuring logical disk activity, file system events, which are generated when processes access the file system via an API, are traced and reduced by the methods described in the device driver section.

CPU ACTIVITY

CPU activity, or utilization, is measured in the preferred embodiment by starting a process and assigning the process to the lowest priority level in the system. Rather than tracking the amount of work that the process can perform, as was done in the prior art, this invention tracks the amount of time this lowest priority process is executing in the system. Since the process only executes when all other processes at a higher priority have completed their tasks, and no longer need the CPU, the amount of time the system is idle (or available to perform other tasks) is the amount of time the idle process was executing. In the preferred embodiment, data processing system tasks are divided into four classes: (i) Time Critical, which is the highest priority, (ii) Fixed High, which runs before any regular task, (iii) Regular, which is the normal class assigned to application programs, and (iv) Idle, which means don't run if Time Critical, Fixed High, or Regular priority tasks are ready to execute.

In the preferred embodiment, the OS/2 RAS Trace Facility, or SYSTRACE, provided by the OS/2 operating system is used to obtain an event trace of this low-level process system activity. This SYSTRACE facility is more fully discussed in the device driver section. Other similar types of system tracing facilities provided by other operating systems could be used in a similar manner to provide this utility, and not depart from the spirit and scope of the present invention. The following describes the specific SYSTRACE utilization.

DEVICE DRIVER

In the preferred embodiment, a device driver has been written to perform the following SYSTRACE utility. The device driver is installed in the normal way, being identified in the CONFIG.SYS file which the data processing system reads upon Initial Program Load(IPL). Special groups of instructions, called hooks, are included at key points in system and application programs in order to track execution flow. Each hook has a unique identity (Major code and Minor code) distinguishing it from all other hooks, and may or may not include key program variables, symbols, or return codes as data items. In the preferred embodiment of OS/2, there exists a facility known as SYSTRACE which provides means for hooks to be generated, collected, and stored in a buffer. Other operating systems provide similarly functionality through their own system utilities, and this utility can be considered as a generic tool for managing hooks.

The device driver intercepts all hooks passing through SYSTRACE, filters out undesired hooks or information contained therein, and passes only the precise hooks and information desired by the control program. The device driver and control program are the two elements comprising the previously discussed Data Collection Facility.

Upon device driver installation during system initialization, a 64K buffer is allocated in which data will be formatted and passed to the control program. This buffer is internally divided into two 32K buffers, with a portion of the second buffer being a communications area for use between the device driver and the control program. The communication area is simply a portion of data processing system memory reserved for variables. This memory is accessible by both the device driver and the application program. The following Table 2 defines the variables which occupy the highest (i.e. last) 32 words of the second 32K buffer.

TABLE 2

| | | |
|---|---|---|
| time_int | equ 0FFE0H | First DD variable uses 0FFE0 & 0FFE2 |
| varA0 | equ 0FFE0H | One of words used on timetag arithmetic |
| varA2 | equ 0FFE2H | One of words used on timetag arithmetic |
| start_time | equ 0FFE4H | Second DD variable uses 0FFE4 & 0FFE6 |
| varB0 | equ 0FFE4H | One of words used on timetag arithmetic |
| varB2 | equ 0FFE6H | One of words used on timetag arithmetic |
| elapsed_time | equ 0FFE8H | Third DD variable uses 0FFE8 & 0FFEA |
| var_FFE8 | equ 0FFE8H | One of words used on timetag arithmetic |
| var_FFEA | equ 0FFEAH | One of words used on timetag arithmetic |
| Dekko_SEL | equ 0FFECH | Fourth DD: DEKKO FIRST 0FFEC only 1 word |
| PID | equ 0FFEEH | Fourth DD: OTHER word for PID |
| var_FFEC | equ 0FFECH | One of words used on timetag arithmetic |
| var_FFEE | equ 0FFEEH | One of words used on timetag arithmetic |
| flush | equ 0FF0H | if 1, flush hook, otherwise process normally |
| var_FFF0 | equ 0FF0H | One of words used on timetag arithmetic |
| switch | equ 0FFF2H | if not 0, switch buffers == "flush buffers" |
| var_FFF2 | equ 0FFF2H | One of words used on timetag arithmetic |
| reals | equ 0FFF4H | accumulates number of real mode hooks |
| var_FFF4 | equ 0FFF4H | One of words used on timetag arithmetic |
| var_FFF6 | equ 0FFF6H | One of words used on timetag arithmetic |
| var_FFF8 | equ 0FFF8H | One of words used on timetag arithmetic |
| int_nesting | equ 0FFAH | keeps up with nesting depth of interrupts |
| var_FFFA | equ 0FFAH | One of words used on timetag arithmetic |
| current_time | equ 0FFCH | last DD variable uses 0FFFC & 0FFFE |
| oldtime | equ 0FFCH | save previous value |
| bigtime | equ 0FFEH | keep up with high word of time |
| shortbuf | equ 0202OH | approx. 24 bytes effective buffer size is 08000 - shortbuf |

Hooking

Also during this device driver install, the device driver saves a copy of the original SYSTRACE code located at the label "strp_common" for future use. A call to the OS/2 system routine DevHelp is used to obtain this address, as shown below:

TABLE 3

SAMPLE ASSEMBLY CODE TO OBTAIN THE LOCATION
OF "strp_common"
AX:BX POINTS TO THE VARIABLE
```
        mov         al,10D
        mov         dl,DevHlp_GetDOSVar
        call        DevHelp
```

At some later time, the control program executes a "READ" to the device driver at which time the device driver installs a patch (modified code) over a portion of the SYSTRACE kernel code. The patch contains bi-modal (REAL or PROTECT, two differing addressing modes known to those of ordinary skill in the art to be a part of the Intel microprocessor architecture) code which can intercept hooks coming through SYSTRACE in either REAL or PROTECT mode, and filter out those tasks of interest, and perform other tasks, such as event tracing.

Unhooking

At a still later time, when the system is ready to shutdown, the control program executes a "WRITE" to the device driver, at which time the previously saved SYSTRACE kernel code is restored to its original position in the SYSTRACE facility, thus fully reinstating the original SYSTRACE function.

DATA GATHERING

Event tracing refers to a process of tracing events as they occur in the data processing system. Time stamps are associated with each event. The events are stored and processed in chronological order. Since the events are chronologically ordered, the events provide the sequence of activities that take place in the data processing system. An example of an event trace is shown in the following Table 4.

TABLE 4

EVENT TRACE EXAMPLE

| Time_0 | Event_0 data |
|---|---|
| Time_1 | Event_1 data |
| Time_2 | Event_2 data |
| Time_3 | Event_3 data |
| Time_4 | Event_4 data |
| Time_5 | Event_5 data |
| Time_n-1 | Event_n-1 data |
| Time_n | Event_n data |

The SYSTRACE facility uses the low resolution system clock to place time stamps on events its processes. This is inadequate for the present invention when attempting to analyze performance on system resources. Thus, one of the data processing system's timers is used to determine the delta (difference) times between events and to replace the time in the SYSTRACE records shown above in Table 3 with a high resolution time tag.

TIMER

Figure 10:
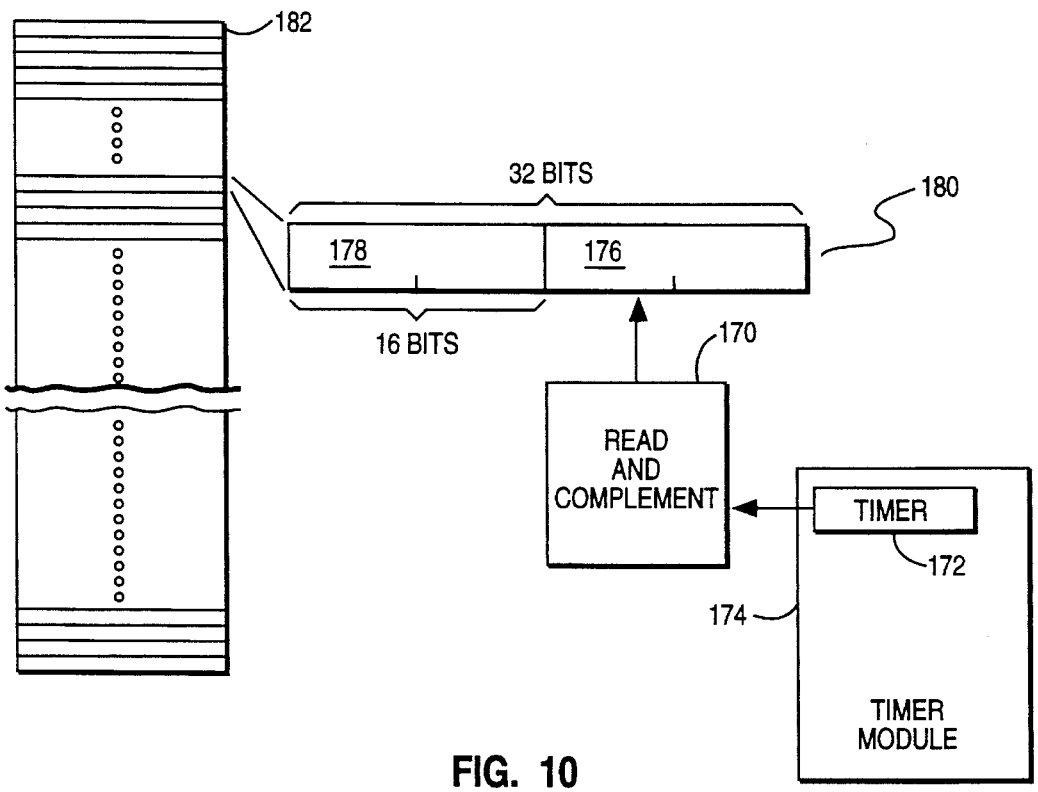
FIG. 10 shows the construction of a high resolution system timer.

The hardware timer of the preferred embodiment is an Intel 8253 timer, which has multiple timers contained within. More detailed information on the 8253 timer can be found in the Intel Manual entitled "Intel Component Data Catalogue", available from the Intel Literature Dept. in Santa Clara, Calif., and hereby incorporated by reference as background material. Timer 0 is programmed to Mode 2. This mode provides a high resolution timer which starts at 0xFFFF and counts downward to 0x0000 and repeats. The timer function again begins at 0xFFFF, or in other words the timer rolls-over. Timer 3 is partially initialized so that the ordinary interrupt generated by other timers on the 8253 timer module are disabled. Ordinarily, when one of the timer/counters counts down to zero, an interrupt is issued so that the system will know that the time being counted has elapsed. In the preferred embodiment of this invention, an interrupt is not desired at the expiration of the timer/counter, and so this is inhibited by partially initializing Timer 3, also known as the watchdog timer (in other possible embodiments, the above timers may be real or they may merely be emulated by software techniques). The actual time interval being counted is approximately 0.8380953445 microseconds per tic. Referring now to FIG. 10, an internal register 180, allocated in system main memory 182 and initialized to 0x0000, is incremented each time the interval timer rolls over from 0x0000 to 0xFFFF. The device driver reads at 170 the value from the internal timer 172 of the timer module 174. This value is then one's-complemented, so that the value effectively ranges from 0x0000 to 0xFFFF. This complemented timer value 176 is combined with the internal register value 178 to provide a 32 bit timer 180 which can count to approximately one hour before it rolls over. The high order word 178, which is 16 bits, is the internal register rollover counter, and the low order word 176, also 16 bits, is the complemented timer value. This 32 bit value is known as the Time Tag 180, whose use will be described below.

In order to maintain timing integrity, the above described internal timer must be read at least once every 55 milliseconds, in order to not miss a rollover. Activating SYSTRACE Major Code 04 will suffice for this requirement. Major Code 04 turns on or enables interrupts, which includes the timer interrupt. Since each timer interrupt occurs every 32 milliseconds in the preferred embodiment, this will guarantee that an event occurs (and an associated read of the 8253 timer) at least once every 55 milliseconds. This is because the 8253 timer is read every time an event, including an interrupt, occurs. Now that the timer operation is understood, discussion will now turn to when the timer is read.

Hooks are events that are capable of being monitored, and trigger a particular response in the data processing system. An event in OS/2 is usually described by two hooks, a pre-hook and a post-hook. For example, when an I/O request is made, the device driver generates a pre-hook signalling the system that a request is about to be made to the I/O adapter. When the adapter completes the I/O request, the device driver signals the completion of the event with a post-hook. The time between the pre- and post-hooks represents the elapse time of the event. More specifically, as events occur, such as an I/O request, the kernel servicing the events calls the SYSTRACE routine with information describing the event. This allows SYSTRACE to process the event. Each time a hook arrives at the SYSTRACE patch code, meaning that a hook was invoked and that SYSTRACE is processing it, the timer is read and the high byte incremented if necessary (i.e. if the timer rolled over, as described above). The hook is examined to see if it is one of the desired hooks. If the received hook is one that is being monitored, it is processed further. Otherwise, it is flushed, or continues on with normal processing.

If the hook is an interrupt, 04/xx, the device driver measures the time spent processing interrupts. This is accomplished by matching the event called "start of an interrupt", called a pre-hook and which is generated when an interrupt handler begins to process the interrupt request, with the event "end of interrupt", called a post-hook and which is generated when an interrupt handler completes the processing of an interrupt request. As such, there is a one-to-one correspondence between pre- and post-hooks, and the timestamps of each are subtracted from one another to yield the time spent processing the interrupt.

It is also possible that after a pre-hook occurs, a subsequent pre-hook occurs before a corresponding post-hook occurs for the first pre-hook. This nesting of hooks is easily handled in that any post-hook received is paired with the most recently received pre-hook. In other words, after one hook starts, another can start, but the second will end before the first will end. In this nesting scenario, the end time minus the start time, and minus all nested activities, is how long the outer event took.

If the hook is a Mode Switch, 02/xx, the device driver measures the time spent in the REAL mode of the CPU by tracking the time from the first mode switch until the scheduler dispatches a different process. This time is then subtracted from the time when a mode switch to PROTECT mode occurs.

Figure 11A:
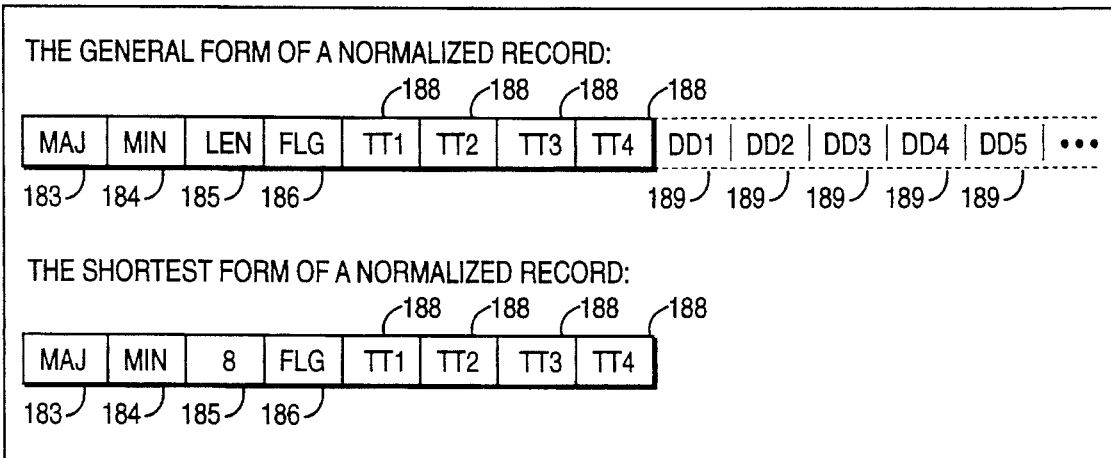
FIG. 11a–11b shows the format of a generalized record which is stored in the internal device driver buffer.

If the hook is a Thread Dispatch, 12/01, the device driver first saves the process identification (PID) and thread identification (TID) from its data area (PID and TID is common terminology in OS/2 architected systems; the PID is a 16-bit number that uniquely identifies a process within the OS/2 environment. The PID value starts at 0001 and increments each time a process is created. TID's are required as several threads can exist in one process). Then, the device driver examines its data to see if it has a PID identical to the PID in the previous Thread Dispatch hook 12/01, in which case the hook is flushed. Otherwise, the time spent in Interrupts and the time spent in REAL mode is appended to the existing Thread Dispatch 12/01 data, which is the PID and TID provided by the scheduler describing the event. The entire Thread Dispatch hook is reformatted to conform to standard PERFMON/DEKOVERT format, as shown in FIG. 11a and described later, and written to one of the device driver's 32K buffers. The two registers holding the accumulated Interrupt time and the REAL mode time are then reset to zero.

Figure 11B:
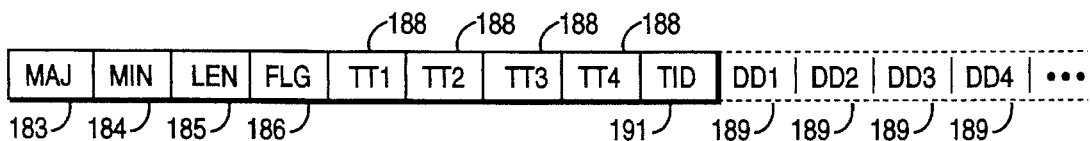

If the hook is a FileSystem hook, 30/xx, then the current TID 191 is inserted ahead of the Normal Data, as shown in FIG. 11b.

The above listed, and other, hooks of interest are also reformatted so that they resemble the PERFMON/DEKOVERT format, and written to one of the 32K buffers. The first eight bytes of each record are the Major Code 183, the Minor Code 184, the Data Length 185, a Flag 186, and the four byte Time Tag 188, as shown in FIG. 11. The subsequent bytes shown, DD1–DDn at 189 are the hook data. When one of the buffers is full, i.e. has used 24K of its 32K space, the buffers are switched using conventional programming techniques, and the full 32K buffer is made available to the control program. Data collection continues in the other 32K buffer.

The device driver also provides for swapping these buffers on a signal from the control program, in order to be able to provide the control program with data accumulated up to that point. A similar operation occurs whenever a TRACE Command is issued, 00/02, hook is received and the first data byte is 0x00 (meaning that TRACE has been turned off). In this case, it is mandatory that the control program receive the current buffer immediately, as there will be no further accumulation of data in either buffer.

Communication between the control program and the device driver is achieved by using the communication area in the respective 32K buffer as follows. In order for the control program to reset the device driver and the device driver's buffers, the control program loads a control word in the communication area to the value '2', as shown in Table 2. When the device driver completes a reset, it changes this a value to '1'. If the control program desires to pause the device driver and buffer filling, the control program loads a control word in the communication area to a value of '1'. When the control program desires the device driver to resume, the control program loads this control word to a value of '0'. When the control program desires to shut down, or stop, the control program unhooks the device driver as previously described. Operation is then suspended until such time that the control program sends another READ command to the device driver.

DATA REDUCTION

Low-level event trace performance data is transformed into high level system activities. This is accomplished by the following methodology. First, pre-hook and post-hook events are matched, as previously discussed, and then these two hooks are transformed into one event. This is because a single record can be used to replace the pre- and post-hooks since it is now known how long the event took, and this event timing is the desired granularity of information needed. Additionally, as described above, events are filtered to only use information in the event records that are of interest to the control program.

APPLICATION PROGRAMMING INTERFACE (API)

The following describes the application programming interface (API) to the Data Collection Facility. This API allows client applications to retrieve performance data and access the Memory Analyzer.

The API is implemented through two named pipes called the System Pipe and the Trace Pipe. The System Pipe is used by a client application to send parameters to and receive responses from the Data Collection Facility. The Trace Pipe is used by a client application to receive continuous performance data. The Data Collection Facility creates both pipes; the client application issues the OS/2 function calls DosOpen and DosClose to access the pipes. Both pipes are created as message pipes in blocking mode (see the "IBM Operating System/2 Version 1.2 Programming Tools and Information" for additional information, hereby incorporated by reference as background material).

System Pipe

A client application controls the actions of the Data Collection Facility through the System Pipe. The client application reads from and writes to the pipe in message mode. Each message written to the pipe represents one parameter from the syntax diagram. A message must be an ASCIIZ string (that is, a null-terminated string, or one byte of binary zeros) including numbers (for example, decimal 10 must be sent as the string "10").

The Data Collection Facility sends responses back to the client application through the System Pipe. The name, used by the client application on the OS/2 function call DosOpen, of the System Pipe in a local machine is \PIPE\SYSTEM.SPM; on a remote server the name of the pipe is \\server_name\PIPE\SYSTEM.SPM.

Output from the Memory Analyzer (/THESEUS theseus_ command) is also sent from the Data Collection Facility to the client application through the System Pipe. First the return codes are sent. Then, output, if any, from the Memory Analyzer command is sent. Each message represents a single line from the Memory Analyzer; maximum line length is 100 characters. This output is followed by a done message represented by five pound signs (#####) followed by a null character (00). The System Pipe is disconnected by the Data Collection Facility when the client application closes the pipe with the OS/2 function call DosClose.

Figure 12:
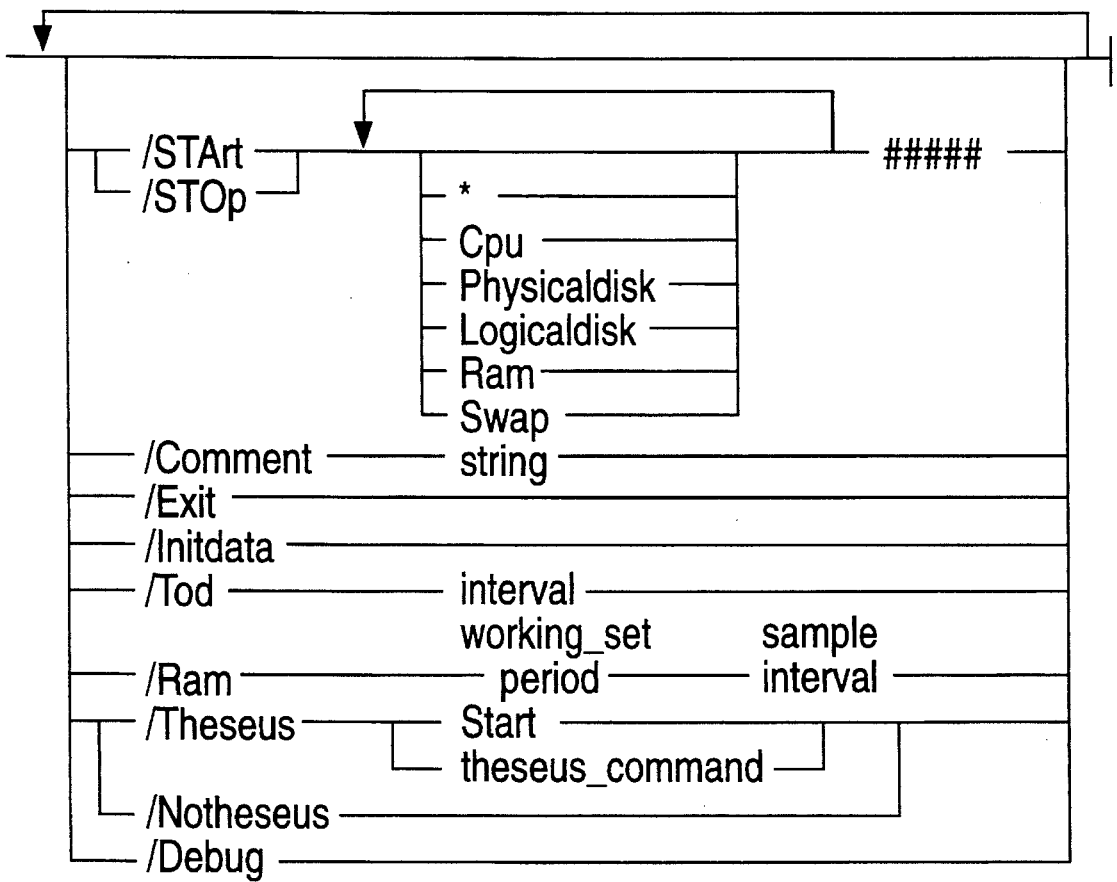
FIG. 12 the syntax structure for an application programming interface to a performance data gathering control program.

FIG. 12 details a syntax diagram for messages that may be sent to the Data Collection Facility through the System Pipe. Syntax parameters are explained in Table 5. A parameter is represented as a contiguous set of characters. Parameters with uppercase characters are keywords.

Each parameter must terminate with a null character (binary zero). For example, to send the comment "Performance data for SERVER1" to the SPM application, send the following messages:

TABLE 5

/COMMENT
Performance dataa for SERVER1
Data Collection Facility
Parameters

| Parameter | Action |
|---|---|
| /START | Indicates the types of resources about which trace pipe records are to be sent by the Data Collection Facility. See also Table 8-3.<br>  *  Indicates CPU, physical disk, RAM and swap resources when used with the /START parameter (does not indicate logical disk). Indicates all resources when used with the /STOP parameter.<br>  CPU  Indicates CPU resources.<br>  PHYSICALDISK  Indicates physical disk resources.<br>  LOGICALDISK  Indicates logical disk resources.<br>  RAM  Indicates random access memory resources.<br>  SWAP  Indicates swapping resources<br>  Note:  All trace pipe records without a specific type (designated as "No Type" in Table 8-3 are included whenever any of the preceding options are specified. |
| /STOP | Indicates the types of resources about which trace pipe records are not to be sent by the Data Collection Facility. See option descriptions under /START. See also Table 8-3. |
| ##### | Done message. Indicates the end of resource specification messages following the /START or /STOP parameter. |
| /COMMENT | Imbeds a comment with the collection data.<br>  string  Comment to be imbedded in the current collection data. Comments cannot be longer than 40 characters; longer comments are truncated to 40 characters and are accepted without error by the Data Collection Facility. The string must be sent as a separate message if it contains embedded blanks. |
| /EXIT | Stops capturing data and releases the Data Collection Facility from memory. All processes started by the Data Collection Facility are also stopped (IDLECPU and THESEUS). |
| /INITDATA | Sends initialization records from the Data Collection Facility through the Trace Pipe. The following records are included:<br>- A Process Info record for the IDLECPU process. This is the process used by the Data Collection Facility to determine the time the CPU was idle. This process executes at idle priority, level 0 (zero).<br>- A System Info record.<br>- A Process Info record for all processes currently executing in the system. These records are only sent if the Memory Analyzer has been started (see the /THESEUS START parameter).<br>Note:  The CPU resource must be started (see the /START CPU parameter in TABLE 8-3) in order to receive Process Info records. |
| /TOD | Specifies the interval (in seconds) between Time of Day records sent by the Data Collection Facility through the Trace Pipe.<br>  interval  The number of seconds between Time of Day records. The range of possible values is 1 to 100 seconds. The default is 5 seconds, but the interval parameter may have been set to another value by a previous application. |
| /RAM | Controls the periods used in sampling random access memory. See the RAM record description in Table 8-3 for information about the samples.<br>Note:  This parameter does not imply /START RAM. See /START RAM at beginning of table for more information about enabling the RAM resource.<br>working_set_period<br>  The time frame, in seconds, used in determining the amount of physical RAM included in the working set. Each sample represents the amount of RAM used during the last working set period. The range of possible values is 5 to 3600; the default is 60 seconds, but the working_set_period parameter may have been set to another value by a previous application.<br>  Note:  Until a full working set period has elapsed, the working set represents only the percentage of RAM in the working set since issuing the /RAM parameter or since the working set period was changed.<br>sample_interval<br>  The number of seconds between RAM samples. A RAM trace pipe record is sent each time a sample is taken. The range of possible values is 5 to 3600; the default is 10 seconds, but the sample_interval parameter may have been set to another value by a previous application.<br>Note:  For performance reasons, the SPM application requires that the working_set_period parameter value divided by the sample_interval parameter value be less than or equal to 200. |
| /THESEUS | Starts the Memory Analyzer if it has not already been started by the Data Collection Facility. Provides a programming interface to the Memory Analyzer from an application.<br>Note:  The Memory Analyzer full-screen |

TABLE 5-continued

/COMMENT
Performance dataa for SERVER1
Data Collection Facility
Parameters

| Parameter | Action | |
|---|---|---|
| | | interface is not available from the copy of the Memory Analyzer started by the Data Collection Facility in this manner. |
| | START | Causes the Memory Analyzer to be started if it has not already been started by the Data Collection Facility. |
| | theseus_command | Any Valid Memory Analyzer command. The theseus_command must be sent as a separate message if it contains embedded blanks. |
| | Note: | All the Memory Analyzer commands (theseus_command) are interpreted directly by the Memory Analyzer, including the THESEUS LOG command. All actions will occur from the reference point of the Memory Analyzer started by the Data Collection Facility as though they were typed at the Memory Analyzer full-screen interface. |
| /NOTHESEUS | Terminates the Memory Analyzer if it has been started by the Data Collection Facility. This saves the RAM overhead associated with the Memory Analyzer on the collection machine. However, Process Info records for processes currently executing in the system (excluding the IDLECPU process) are not sent through the Trace Pipe. This includes processes executing when the /INITINFO parameter is sent. | |
| /DEBUG | Indicates that the Data Collection Facility is to log parameters it receives from client applications to the log file SPMLOG.LOG in the working directory. | |

One status message is sent to the client application by the Data Collection Facility for every parameter that has a slash (/) as its first character. This status message provides an indication of the success of the request from the parameter. The format of a status message is described in the following table.

| | |
|---|---|
| SPM Return Code | 2 Bytes (Word) |
| Service Return Code | 2 Bytes (Word) |
| Reserved | 2 Bytes (Word) |

Next, the output from any Memory Analyzer commands specified with the /THESEUS parameter (theseus_command) is sent to the client application. Each message represent a single line from the Memory Analyzer. A done message (#####) follows this output.

Values that may be returned in the SPM return code field are contained in Table 6. All values are given in hexadecimal.

TABLE 6

SPM Return Codes

| Code | Description |
|---|---|
| X'0000' | No error, the parameters were accepted. |
| X'0007' | Invalid parameter. The service return code contains the sequence number of the parameter that failed. Each parameter beginning with a slash (/) will reset the sequence number to 1. |
| X'0010' | The working_set_period value is out of range (/RAM parameter). |
| X'0011' | The sample_interval value is out of range (/RAM parameter). |
| X'0012' | The sample_interval value is not a multiple working_set_period value (/RAM parameter). |
| X'0013' | The working_set_period value divided by the sample_interval value is greater than 200 (/RAM parameter). |
| X'0014' | The /TOD interval value is out of range. |
| X'0108' | Unable to issue the TRACE.EXE ON command to the OS/2 system through the OS/2 function call DosExecPgm. |
| X'0208' | Unable to issue the TRACE.EXE OFF command to the OS/2 system through DosExecPgm. |
| X'0408' | Unable to start the IDLESPU.EXE program through the OS/2 function call DosKillProcess. |
| X'0409' | Unable to stop the IDLESPU.EXE program through the OS/2 function call DosKillProcess. |
| X'0806' | The Memory Analyzer does not recognize this OS/2 version. |
| X'0807' | Unable to communicate with the Memory Analyzer. |
| X'0808' | Unable to start the THESEUS.EXE program through the OS/2 function call DosExecPgm. |
| X'0809' | Unable to stop the THESEUS.EXE program through the OS/2 function call DosKillProcess. |
| X'1003' | The device drive THESEUS.SYS was not loaded from the CONFIG.SYS file. |
| X'1005' | An invalid version of the device driver THESEUS.SYS was not loaded from the CONFIG.SYS file. |
| X'2003' | The device driver SPMDCF.SYS is missing in the CONFIG.SYS file. |
| X'2004' | Errors occurred while initializing the SPMDCF.SYS device driver through DosOpen or DosRead. |
| Note: | The service return code is the return code from the requested OS/2 service unless otherwise mentioned in this table. |

TRACE PIPE

The Trace Pipe is used by a client application to retrieve performance data from the Data Collection Facility. The Trace Pipe is a one-way named pipe: Data Collection Facility to client application. On a stand-alone machine, the name of the pipe, as used by the client application on the DosOpen function call, is \PIPE\TRACE.SPM; on a remote server, the pipe name is \\server_name\PIPE\TRACE.SPM. The Trace Pipe is a message stream named pipe (as opposed to a byte stream named pipe) with a maximum message length of 8 kilobytes. The client application should send a /STOP or /EXIT message on the System Pipe to stop the collection and transmission of performance data through the Trace Pipe.

Data is queued in a buffer by the Data Collection Facility before transmission through the Trace Pipe. Messages on the Trace Pipe contain one or more complete trace pipe records. A message is transmitted through the pipe at least every 4 seconds, provided data is available.

The sequence of actions a client application would take to collect performance data from the Data Collection Facility is as follows:

1. Open the System Pipe.
2. Send appropriate messages to the Data Collection Facility (SPMDCF) through the System Pipe (including the /START message), obtaining return codes as applicable.
3. Open the Trace Pipe.
4. Read data from the Trace Pipe until ready to stop collecting.
5. Send a /STOP or /EXIT message to Data Collection Facility through the System Pipe, obtaining return codes as applicable.
6. Close the System and Trace Pipes.

TRACE PIPE RECORD FORMAT

The general format of records sent through the SPM Trace Pipe is:

| Length of Record | Trace Pipe Code | Variable Length Data |
|---|---|---|
| (1 byte) | (1 byte) | (max. 250 bytes) |

TRACE PIPE RECORDS

The records listed in FIGS. 13A–C may be sent from the SPM application to a client application through the Trace Pipe.

TABLE DEFINITIONS

ASCIIZ string
　A string of characters followed by a nullcharacter (ASCII 00). Maximum number of characters is 250.
data overflow
　Indicates that data has been discarded by the Data Collection facility. Usually this occurs if the client application is not reading data from the Trace Pipe quickly enough.
doubleword
　4 bytes in Intel format (that is, byte/word-reversed). In IBM C/2, this is an unsigned long integer (ULONG).
elapsed time
　Total timertics encountered during the operation. This is not to be interpreted as time the operation was busy using the CPU, but rather, the time between when a request was submitted and when the operation completed. For example, a swap request is made by the swapper; then the swapper may give up the CPU to another process until disk I/O can complete; then the swapper completes the operation. The elapsed time includes the entire time, including the time the swapper was blocked waiting for the disk.
ID of the first physical disk
　The ID assigned to the first physical disk by the system. Each physical disk is assigned a sequential number, beginning with the ID assigned to the first physical disk.
number of physical disks
　The total number of physical disks installed in the system.
number of sectors
　Number of 512-byte sectors.
physical disk ID
　The ID assigned to the physical disk.
process name
　This is the name of the process defined in the .EXE header or the file name of the .EXE file (does not include a period or the file extension).
time executing previous process
　Total timertics encountered while executing the previous process (includes time spent at interrupt level [time in interrupts previous process]).
time in interrupts previous process
　Total timertics encountered while at interrupt level while executing the previous process.
time since last Time of Day record
　The elapsed timertics since the last record was sent. This value is provided for accurate calculations.
timertic
　A value derived from the 8253/8254 chip. This value can be converted to microseconds by multiplying the value by 0.8380953445; that is:

$$microseconds = timertics \times 0.8380953445.$$

TRACECMD
　Indicates that the user issued a trace command.
word
　2 byes in Intel format (that is, byte-reversed). In IBM C/2, this is an unsigned short integer (USHORT).

GRAPHICAL PRESENTATION

In order to graphically depict the resource utilizations or performance monitors described above, the preferred embodiment of this invention uses OS/2 Presentation Manager window and graphics functions. This method allows a user to view multiple groups of related information in multiple windows (or viewports) simultaneously. One main window, called the parent window, contains all the other windows, called child windows, that display resource utilization information. As shown in FIG. 6, the resource information is presented in the form of graphs which display percentage utilization of a certain data processing system resource. The resource utilization data is displayed to represent a user-configurable period of time (e.g. the last 600 seconds), or the viewing period 122 of FIG. 7b. Thus, it provides both instantaneous and recent/past records of resource utilization. A user can choose to view some or all of the resource monitors, as well as modify the display characteristics of the windows. Other information, or the same information in other forms, could be presented in the child windows. Presentation parameters, which control how, and when, the data is displayed in the child windows are changeable by the user from the main window's menu (action) bar. As will be appreciated to those of ordinary skill in the art, standard windows programming techniques are used to present the desired graphical representation to the OS/2 Presentation Manager interface. The Presentation Manager is the entity that actually presents the data in a display window or viewport. Other operating systems, such as DOS in combination with Microsoft's Windows[2], HP's New Wave[3], XWindows[4], or AIXWindows[5] provide similar programming interfaces to a window-like presentations and could similarly be used in the presentation of resource monitors in their respective systems, without departing from the spirit and scope of the present invention.

[2]Trademark of Microsoft Corp.
[3]Trademark of Hewlett-Packard Corp.
[4]Trademark of M.I.T.
[5]Trademark of IBM Corp.

Figure 14:
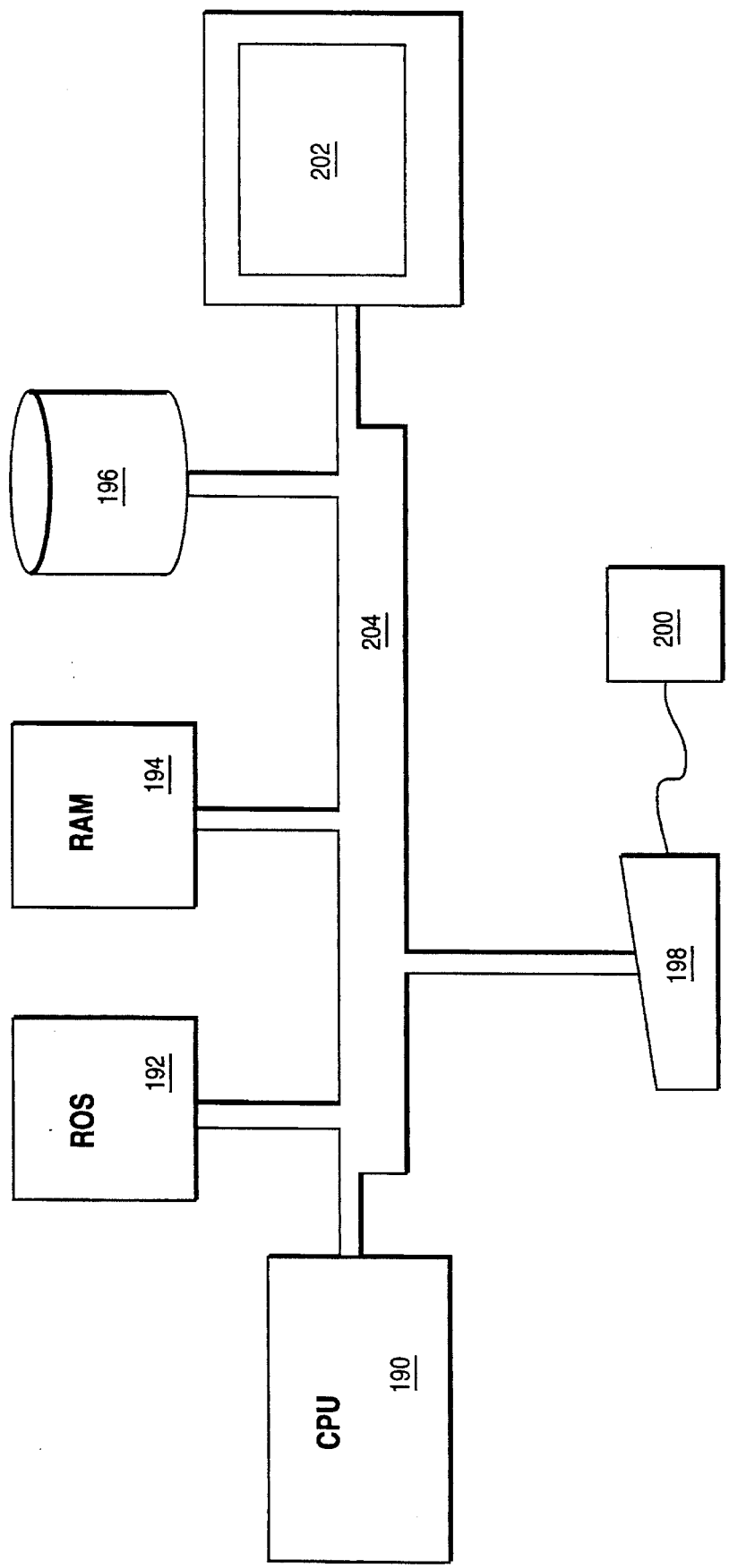
FIG. 14 shows a data processing system.

Finally, FIG. 14 depicts are generalized data processing system which is the preferred embodiment of this invention.

A CPU 190, RAM 194, and peripheral device 196 (shown as a direct access storage device, or DASD), and interconnected via a bus structure. Similarly, ROS 192 and a keyboard 198 having an pointer/input device 200 are attached to this bus 204. These are the resources capable of being monitored in the preferred embodiment. Also attached to this bus is a display means 202, capable of rendering the resource monitor's results to a user. This display means is similarly attached to the common bus 204. Other variations having high speed paths between specific devices, and not a general bus as shown, would similarly fall within the realm of this invention, and would not be a departure from the scope of spirit of the herein claimed invention.

As has been shown in the above description, this data processing system utilization monitor with tracing provides for real-time performance monitoring without specialized hardware and without significant impact to the system performance being monitored.

While we have illustrated and described the preferred embodiments of our invention, it is to be understood that we do not limit ourselves to the precise construction herein disclosed and the right is reserved to all changes and modifications coming within the scope of the invention as defined in the appended claims.

Appendix

```c
/*  SPM API C Sample Program                                              */
/*                                                                        */
/* (C) Copyright International Business Machines Corporation 1990-1991.   */
/* All rights reserved.                                                   */
/*                                                                        */
/* WHAT THIS PROGRAM DOES:                                                */
/* ----------------------                                                 */
/*                                                                        */
/* This program opens the SPM System Pipe and uses the SPM                */
/* API to send commands to the SPM Data Collection Facility. Specifically,*/
/* the program instructs the Data Collection Facility to report swapping  */
/* activity.  The program then opens and reads records from the Trace Pipe.*/
/* This program uses the swap records from the Trace Pipe and displays    */
/* those records on standard output.  When the user hits F3, the program  */
/* instructs the SPM Data Collection Facility to stop sending data, and   */
/* then the program closes both pipes and exits.                          */
/*                                                                        */
/* WHAT THIS PROGRAM DEMONSTRATES:                                        */
/* ------------------------------                                         */
/* This program provides an example of communication with the SPM Data    */
/* Collection Facility via its Application Programming Interface (API).   */
/* The program shows one way to use the SPM System Pipe and Trace Pipes.  */
/*                                                                        */
/*                                                                        */
/**************************************************************************/

/**************************************************************************/
/*        Include the required sections of the toolkit header files       */
/**************************************************************************/ define INCL_DOSFILEMGR
define INCL_DOSNMPIPES
#define INCL_DOSERRORS
define INCL_KBD pragma pack(1)   /* IBM C/2 pragma to force structures onto byte boundaries*/

/**************************************************************************/
/*                   Include required header files                        */
/**************************************************************************/ include <os2.h>
include <stdio.h>
#include <stdlib.h>
#include <string.h>
#include "sample.h"
#include "spm2api.h"

/*------------------------- Global Definitions ---------------------------*/

SPMDCFREPLYDEF spmdcfRetCodes;           /* SPM System Pipe return code   */
                                         /*    structure                  */

/*------------------------- Prototype Definitions ------------------------*/

BOOL   InitSPMDCF  (PIPEDEF *, PIPEDEF *); /* Start communications with SPMDCF */
BOOL   StopSPMDCF  (PIPEDEF *, PIPEDEF *); /* Stop communications with SPMDCF */
BOOL   ReadTraceData (PIPEDEF *);        /* Read performance data         */
USHORT OpenPipe  (PIPEDEF *);            /* Open a named pipe             */
USHORT ClosePipe (PIPEDEF *);            /* Close a named pipe            */
USHORT ReadPipe  (PIPEDEF *, UCHAR *, USHORT);  /* Read data from a named pipe*/
USHORT WritePipe (PIPEDEF *, UCHAR *, USHORT);  /* Write data to a named pipe */
```

```c
/******************** Start of Main Procedure ********************/
/*****************************************************************/
/* MAIN:                                                         */
/* main calls functions to 1) start communicating with the SPM Data */
/* Collection Facility, 2) read and interpret data from the SPM */
/* Trace Pipe, and 3) close communications with the SPM Data    */
/* Collection Facility.                                          */
/*                                                               */
/* TracePipe and SystemPipe are defined and initialized in the header */
/* file                                                          */
/*****************************************************************/

VOID cdecl main()
{ printf("SPM  API C Sample Program\n");
    printf("(C) Copyright International Business Machines Corp. 1990,1991.\n");
    printf ("\nPress F3 to quit.\n\n");
    printf("Initializing communication with SPM Data Collection Facility...\n");

/*--- Instruct SPM Data Collection Facility to send data ---*/
    if (InitSPMDCF(&SystemPipe, &TracePipe) != NO_ERROR) {
        DosExit(EXIT_PROCESS, 1);
    } printf("Reading swap data...\n");

/*--- Read data and output desired information ---*/
    ReadTraceData(&TracePipe );

printf("Closing communications with SPM Data Collection Facility...\n");

/*--- Instruct SPM Data Collection Facility to stop sending data ---*/
    StopSPMDCF(&SystemPipe, &TracePipe);

printf("Done.\n");
}

/******************** End of Main Procedure ********************/
```

```c
/************************************************************************/
/*                                                                      */
/* InitSPMDCF:                                                          */
/* Starts communication with the SPM Data Collection Facility.          */
/* Opens System pipe, sends commands to send performance data about     */
/* swapping activity, and then opens the Trace Pipe.                    */
/* Returns OS/2 service return code if an error occurs.                 */
/*                                                                      */
/************************************************************************/
BOOL InitSPMDCF (PIPEDEF *SystemPipe, PIPEDEF *TracePipe)
{

SPMDCFREPLYDEF SPMDCFReply;          /* SPMDCF return codes structure */
   USHORT rc;

/*---- Start communication with the SPM Data Collection Facility by  */
   /*---- opening the System Pipe.                                      */
   if ((rc = OpenPipe (SystemPipe)) != NO_ERROR) {
      fprintf(stderr, "Error opening system pipe: rc = %d\n", rc);
      return rc;
   }

/*---- Instruct the SPM Data Collection Facility to send records     */
   /*---- over the trace pipe when swapping is detected.                */
   if ((rc = WritePipe (SystemPipe, "/START SWAP", 0)) != NO_ERROR) {
      fprintf(stderr, "Error writing to system pipe: rc = %d\n", rc);
      return rc;
   }

/*---- Tell SPM Data Collection Facility that this message is complete. */
   if ((rc = WritePipe (SystemPipe
                       ,PIPE_MSG_DONE
                       ,PIPE_MSG_DONE_LEN)
       ) != NO_ERROR) {
      fprintf(stderr, "Error writing to system pipe: rc = %d\n", rc);
      return rc;
   }

/*---- Read and check the response from the SPM Data Collection Facility */
   if ((rc = ReadPipe (SystemPipe, (VOID *) &SPMDCFReply, sizeof(SPMDCFReply))
       ) != NO_ERROR) {
      fprintf(stderr, "Error reading from system pipe: rc = %d\n", rc);
      return rc;
   }
   if (SPMDCFReply.SPMRetCode != SPMNOERROR) {
      fprintf(stderr, "Error from SPMDCF: SPM return code    = %d\n",
              SPMDCFReply.SPMRetCode);
      fprintf(stderr, "                    service return code = %d\n",
              SPMDCFReply.ServiceRetCode);
      fprintf(stderr, "                    service category    = %d\n",
              SPMDCFReply.SPMRetCode);
      return SPMDCFReply.SPMRetCode;
   }

/*---- Open the trace pipe in order to read data from SPMDCF */
   if ((rc = OpenPipe (TracePipe)) != NO_ERROR) {
      fprintf(stderr, "Error opening trace pipe: rc = %d\n", rc);
      return rc;
   }
   return NO_ERROR;
}
```

```
/****************************************************************/
/* ReadTraceData                                                */
/* This function monitors the Trace Pipe for records indicating */
/* that swapping took place.  If a such a record is read from the Trace*/
/* Pipe, it is printed.  Function terminates when F3 is pressed. */
/****************************************************************/
BOOL ReadTraceData (PIPEDEF *TracePipe)
{
    static UCHAR    spmBuffer[MAX_SPMDCF_MSG_SIZE]; /* buffer for trace data */
    static UCHAR    *spmBufferPtr;    /* place holder in trace buffer */
    static USHORT   bufferContentsSize, bytesScanned;
    SPMTRACERECS    *spmRecord;       /* pointer to record in buffer */
    static USHORT   pipeHandle;       /* local storage of named pipe file handle */
    static USHORT   rc;
    static BOOL     done;
    KBDKEYINFO      KBDKey;
    HKBD            KBDHandle = 0;

pipeHandle = TracePipe->Handle;   /* local storage (better performance) */

KBDKey.chScan = 0;
    done = FALSE;                     /* Until the F3 key is pressed */ do {
       do {
          /*---- Read data from the trace pipe; this call will block until */
          /*---- data is received.                                         */
          /*---- If ERROR_MORE_DATA, then read a new buffer in.            */
          /*---- ERROR_MORE_DATA is not expected and only occurs in very   */
          /*---- unusual circumstances.                                    */ rc = DosRead (pipeHandle
                       ,spmBuffer
                       ,MAX_SPMDCF_MSG_SIZE
                       ,&bufferContentsSize);

if (rc == ERROR_MORE_DATA) {
             fprintf(stderr, "Error reading trace pipe: ERROR_MORE_DATA\n");
          }
       } while (rc == ERROR_MORE_DATA);

/*---- check for errors */
       if ((rc != NO_ERROR) || (bufferContentsSize == 0)) {
          fprintf(stderr, "Error: broken trace pipe communication.\n");
          return FALSE;
       } /* endif */

/*---- set trace buffer pointer to point to current trace buffer */
       spmBufferPtr = spmBuffer;

/*---- set trace record pointer to point to current record in buffer */
       spmRecord = (SPMTRACERECS *) spmBufferPtr;
```

```c
/*---- scan the buffer for the trace records we want */
for ( bytesScanned = 0;                              \
      bytesScanned < bufferContentsSize;             \
      /* advance spmRecord pointer */                \
      spmBufferPtr += spmRecord->RecLen,             \
      bytesScanned += spmRecord->RecLen)
{ spmRecord = (SPMTRACERECS *) spmBufferPtr;

/*---- Check for spurious trace record lengths */
    /*---- This error should never happen under normal conditions.*/
    if (spmRecord->RecLen == 0) {
        fprintf(stderr, "Error: invalid trace record length = 0\n");
        return FALSE;
    }

/*---- Interpret what kind of record it is and compile stats */
    switch (spmRecord->Code) {

/*---- In this sample program, we seek only Swap records ----*/

/*--- Swap In record ----*/
        case SWAPINCODE:

printf ("Swap In:  elapsed time: %lu timertics, ",
                spmRecord->Data.Swap.ElapsedTime);
            printf ("%lu microseconds, ",
                (ULONG) (0.8380953445 * spmRecord->Data.Swap.ElapsedTime));

printf ("bytes: %lu\n", spmRecord->Data.Swap.Bytes);
            break;

/*--- Swap Out record ----*/
        case SWAPOUTCODE:

printf ("Swap Out: elapsed time: %lu timertics, ",
                spmRecord->Data.Swap.ElapsedTime);
            printf ("%lu microseconds, ",
                (ULONG) (0.8380953445 * spmRecord->Data.Swap.ElapsedTime));

printf ("bytes: %lu\n", spmRecord->Data.Swap.Bytes);
            break;

default:
            /* ignore this record */
            break;
    } /* end switch */
} /* end for */

/*---- check if user wants to quit (F3 key) */
KbdCharIn (&KBDKey, (USHORT) 1, KBDHandle); /* don't wait for keystroke */
if (KBDKey.chScan == 0x3D) {
    done = TRUE;
}                              /* F3 key pressed */

} while ((rc == NO_ERROR) && (done == FALSE));
return TRUE;
}
```

```c
/*****************************************************************/
/* StopSPMDCF:                                                   */
/* Instructs the SPM Data Collection Facility to stop sending    */
/* performance data over the Trace Pipe.  Then closes the Trace and */
/* System Pipes.                                                 */
/*****************************************************************/
BOOL StopSPMDCF (PIPEDEF *SystemPipe, PIPEDEF *TracePipe)
{
    SPMDCFREPLYDEF SPMDCFReply;
    USHORT rc;

/*---- Instruct the SPM Data Collection Facility to stop sending records */
    if ((rc = WritePipe (SystemPipe, "/STOP", 0)) != NO_ERROR) {
        fprintf(stderr, "Error writing to system pipe: rc = %d\n", rc);
        return rc;
    }

/*---- Tell SPM Data Collection Facility that this message is complete. */
    if ((rc = WritePipe (SystemPipe
                        ,PIPE_MSG_DONE
                        ,PIPE_MSG_DONE_LEN)
        ) != NO_ERROR) {
        fprintf(stderr, "Error writing to system pipe: rc = %d\n", rc);
        return rc;
    }

/*---- Read and check the response from the SPM Data Collection Facility */
    if ((rc = ReadPipe (SystemPipe, (VOID *) &SPMDCFReply, sizeof(SPMDCFReply))
        ) != NO_ERROR) {
        fprintf(stderr, "Error reading from system pipe: rc = %d\n", rc);
        return rc;
    }
    if (SPMDCFReply.SPMRetCode != SPMNOERROR) {
        fprintf(stderr, "Error from SPMDCF: SPM return code      = %d\n",
                SPMDCFReply.SPMRetCode);
        fprintf(stderr, "                    service return code = %d\n",
                SPMDCFReply.ServiceRetCode);
        fprintf(stderr, "                    service category    = %d\n",
                SPMDCFReply.SPMRetCode);
        return SPMDCFReply.SPMRetCode;
    }

/*---- Close the trace pipe */
    if ((rc = ClosePipe (TracePipe)) != NO_ERROR) {
        fprintf(stderr, "Error closing trace pipe: rc = %d\n", rc);
        return rc;
    }

/*---- Close the system pipe  */
    if ((rc = ClosePipe (SystemPipe)) != NO_ERROR) {
        fprintf(stderr, "Error closing system pipe: rc = %d\n", rc);
        return rc;
    } return NO_ERROR;
}
/*****************************************************************/
```

```
/**********************************************************************/
/* OpenPipe:                                                          */
/* Attempts to open the pipe indicated by the paramenter Pipe.  If the */
/* pipe is busy, this procedure waits until it becomes free, then     */
/* tries to open the pipe again.  If the pipe is again busy, then a   */
/* return code of ERROR_PIPE_BUSY is returned.  If any other error    */
/* occurs, then the DosOpen return code is returned.                  */
/*                                                                    */
/**********************************************************************/
USHORT OpenPipe(PIPEDEF *Pipe)
{
  USHORT RetCode;
  USHORT ActionTaken;
  USHORT OpenMode;
  BOOL   TriedOnce;

/*---- Don't open the pipe if it's already open */
  if (Pipe->IsOpen==TRUE) {
    return(NO_ERROR);
  } /* endif */

TriedOnce = FALSE;
  RetCode = NO_ERROR;

/*---- Set the correct file mode for the named pipe we are about to open */
  if (Pipe->OpenMode & DUPLEX_PIPE) {
    /*--- System pipe */
    OpenMode = (BASE_OPEN_MODE | READ_WRITE);
  } else if (Pipe->OpenMode & OUT_BOUND_PIPE) {
    /*--- Trace pipe */
    OpenMode = (BASE_OPEN_MODE | READ_ONLY);
  } do {
    /*---- Attempt to open the pipe */
    RetCode = DosOpen(Pipe->Name,
                     &(Pipe->Handle),
                     &ActionTaken,
                     0L,
                     0x0000,      /* FileAttribute              */
                     0x0011,      /* OpenFlag = Create or Open  */
                     OpenMode,    /* OpenMode                   */
                     0L);         /* Reserved                   */

/*---- If we've tried twice and we get an error return code, then return */
    /*---- the error return code.                                            */
    if ((TriedOnce) && (RetCode != NO_ERROR)) { return(RetCode);

} else {
```

```
        /*---- act on the return code */
        switch (RetCode) { case NO_ERROR:
              Pipe->IsOpen = TRUE;          /* Set flag that pipe is open */

/*---- Make sure that the named pipe is in the state that we want */
              RetCode = DosSetNmPHandState(Pipe->Handle,
                                           READ_WRITE_BLOCK | READ_PIPE_AS_MSG
                                          );
              return(RetCode);
              break;

case ERROR_PIPE_BUSY:
              /*---- Wait until the named pipe is free or until time's up */
              DosWaitNmPipe(Pipe->Name, Pipe->BusyWait);
              break;

default:
              /*---- An error occurred, so return the return code from the DosOpen * return(RetCode);
              break;

} /* endswitch */

} /* endelse first time DosOpen was tried, or no error */

TriedOnce = TRUE;                /* set flag to show we tried and failed*/

} while (RetCode != NO_ERROR); /* enddo */ return RetCode;
}
/*****************************************************************************/
```

```
/****************************************************************/
/* ClosePipe:                                                   */
/* Closes the pipe indicated by the parameter and returns the DosClose */
/* return code.  Sets the pipe state in the Pipe structure.     */
/****************************************************************/
USHORT ClosePipe(PIPEDEF *Pipe) {
   USHORT RetCode;

RetCode = DosClose(Pipe->Handle);

if (RetCode == NO_ERROR) {
     Pipe->IsOpen = FALSE;
   } /* endif */ return(RetCode);
}
/****************************************************************/
```

```c
/************************************************************/
/* WritePipe:                                               */
/* Writes data to the pipe indicated by the parameter Pipe. The data */
/* is stored in Buffer, and the length of the data in BufLen. If the */
/* data is an ASCIIZ string, then setting BufLen to zero will cause  */
/* WritePipe to calculate the length of the string.          */
/*                                                          */
/* The DosWrite return code is returned with the exception that if */
/* less data was written than in the data buffer, ERROR_MORE_DATA is */
/* returned. If a DosWrite error occurs, the number of bytes written */
/* is reset to zero.                                        */
/*                                                          */
/************************************************************/
USHORT WritePipe(PIPEDEF *Pipe, UCHAR *Buffer, USHORT BufLen)
{
  USHORT RetCode;
  USHORT DataLen;

/*---- calculate the length of the buffer if not specified */
  if (BufLen == 0) {
    DataLen = strlen(Buffer) + 1;      /* AsciiZ string */
  } else {
    DataLen = BufLen;
  } /* end else */

/*---- write the data to the pipe */
  RetCode = DosWrite(Pipe->Handle, Buffer, DataLen, &(Pipe->BytesWritten));

/*---- check that the write succeeded */
  if (RetCode != NO_ERROR) {
    Pipe->BytesWritten = 0;
  } else if (Pipe->BytesWritten < DataLen) {
    RetCode = ERROR_MORE_DATA;         /*---- not all the data was written */
  } /* endif */ return RetCode;
}
/************************************************************/
```

```
/***********************************************************************
/* ReadPipe:                                                           *
/* Reads the pipe indicated by the parameter.  The data is read from   *
/* the pipe into the specified buffer, and the length of the data      *
/* is returned in the Pipe structure.  BufLen indicates the size of the*
/* data buffer.                                                        *
/* Returns the DosClose return code.  Sets number of bytes read to     *
/* zero if an error occurs.                                            *
/***********************************************************************
USHORT ReadPipe(PIPEDEF *Pipe, UCHAR *Buffer, USHORT BufLen)
{
  USHORT RetCode;

RetCode = DosRead(Pipe->Handle, Buffer, BufLen, &(Pipe->BytesRead));

if (RetCode != NO_ERROR) {
    Pipe->BytesRead = 0;
  } return RetCode;
}
/***********************************************************************
```

```
/********** SAMPLE C Sample Program Header file (.H) *********************/
/*                                                                       */
/* The SAMPLE header file defines symbolic constants used                 */
/* in the SAMPLE.C file.                                                  */
/* SAMPLE local procedure declarations may appear in this file to         */
/* ensure they have been declared before being used.                      */
/*                                                                       */
/* (C) Copyright International Business Machines Corporation 1990, 1991   */
/* All rights reserved.                                                   */
/*                                                                       */
/*************************************************************************/

/* Open Modes for DosCreateNmPipe */
#define PRIVATE_HANDLE           0x0080
#define DELAYED_WRITE_NOT_ALLOWED 0x4000
#define DELAYED_WRITE_ALLOWED    0x0000
#define DUPLEX_PIPE              0x0002
#define OUT_BOUND_PIPE           0x0001

/* Open Modes for DosOpen    */
#define BASE_OPEN_MODE           0x20C0   /* OpenMode 0010 0000 1100 0000 */
#define READ_WRITE               0x0002   /*                         0010 */
#define WRITE_ONLY               0x0001
#define READ_ONLY                0x0000

/* Pipe Mode for DosMakeNmPipe */
#define READ_WRITE_BLOCK         0x0000 /* Wait for data on read/write requests
 */
#define READ_WRITE_NO_BLOCK      0x8000
#define BYTE_STREAM              0x0000
#define MESSAGE_STREAM           0x0400
#define READ_PIPE_AS_BYTE        0x0000
#define READ_PIPE_AS_MSG         0x0100
#define SINGLE_INSTANCE_PIPE     0x0001

/*************************************************************************/
/* Structures and type definitions                                        */
/*************************************************************************/

/* The PIPEDEF structure holds information related to a pipe */
typedef struct _PIPEDEF {
  USHORT BytesWritten, BytesRead, Handle, RetCode;
  USHORT IsOpen, OpenMode, PipeMode;
  USHORT InSize, OutSize;
  ULONG  BusyWait;
  UCHAR  Name[90];
  UCHAR  *Buffer;
} PIPEDEF;
```

```
PIPEDEF SystemPipe =
        /*------------------------------------------------------------------*/
        /* SPM System Pipe (Communication between SPMDCF and Application)*/
        /*------------------------------------------------------------------*/
        0,0,0,0, FALSE,                  /* Run time status fields   */
        (PRIVATE_HANDLE          |       /* Open Mode                */
         DELAYED_WRITE_NOT_ALLOWED |
         DUPLEX_PIPE             ),      /* Receive and send data    */
        (READ_WRITE_BLOCK        |       /* Pipe Mode                */
         MESSAGE_STREAM          |
         READ_PIPE_AS_MSG        |
         SINGLE_INSTANCE_PIPE    ),
        256,                             /* Output Buffer Size       */
        128,                             /* Input Buffer Size        */
        5000L,                           /* Wait ms if busy pipe     */
        "\\Pipe\\System.SPM",            /* Name of the pipe         */
        NULL);                           /* Pointer to Pipe Buffer   */

PIPEDEF TracePipe = (
        /*------------------------------------------------------------------*/
        /* SPM Trace Pipe (trace records sent from SPMDCF to application)*/
        /*------------------------------------------------------------------*/
        0,0,0,0, FALSE,                  /* Run time status fields   */
        (PRIVATE_HANDLE          |       /* Open Mode                */
         DELAYED_WRITE_NOT_ALLOWED |
         OUT_BOUND_PIPE          ),      /* Read data only           */
        (READ_WRITE_BLOCK        |       /* Pipe Mode                */
         MESSAGE_STREAM          |
         READ_PIPE_AS_MSG        |
         SINGLE_INSTANCE_PIPE    ),
        65535,                           /* Output Buffer Size       */
        0,                               /* Input Buffer Size        */
        5000L,                           /* Wait ms if busy pipe     */
        "\\Pipe\\Trace.SPM",             /* Name of the pipe         */
        NULL);                           /* Pointer to Pipe Buffer   */
```

We claim:

1. An article of manufacture comprising:

a computer usable medium having computer readable program code means embodied therein for indicating resource utilization of a data processing system having random access memory, a processor and at least one peripheral device, said computer readable program code means comprising:

computer readable program code means for monitoring usage of said random access memory, a portion of said monitoring being performed by a first device driver which computes a non-allocatable working amount of memory for a specific time period and then adds a portion of allocatable memory to said working memory when it is determined that the allocatable memory portion has been accessed by said processor more recently than said working memory;

computer readable program code means for determining, by a second device driver, usage of said at least one peripheral device by computing a ratio of a total number of hardware timer interrupt signal sent to said at least one peripheral device and a number of corresponding signals received from said device indicating that said device is busy;

computer readable program code means for measuring, by a third device driver, activity of said processor by initiating a process with a lowest possible priority on said processor and determining an amount of idle time when said low priority process is executing on said processor;

computer readable program code means for generating, by said data processing system, resource data, indicating usage of said random access memory, said processor and said at least one peripheral device; and computer readable program code means for displaying in real time, by said data processing system, said resource data of said data processing system.

2. The article of manufacture of claim 1 wherein said at least one peripheral device is a direct access storage device or a communication adapter.

3. The article of manufacture of claim 1 wherein said computer readable program code means for displaying in real time, by said data processing system, said resource data of said data processing system, includes:

computer readable program code means for displaying in real time, by said data processing system, said resource data of said data processing system on said at least one peripheral device.

4. The article of manufacture of claim 1 wherein said at least one peripheral device includes at least one window, and said computer readable program code means for displaying in real time, by said data processing system, said resource data of said data processing system, includes:

computer readable program code means for displaying in real time, by said data processing system, said resource data of said data processing system on said at least one window.

5. The article of manufacture of claim 1 wherein said computer readable program code means for displaying in real time, by said data processing system, said resource data of said data processing system, includes:

computer readable program code means for displaying in real time, by said data processing system, said resource data of said data processing system on a remote data processing system peripheral device.

6. A computer program product for use in a data processing system having random access memory, a processor, and at least one peripheral device, said computer program product comprising:

a computer usable medium having computer readable program code means embodied therein for indicating resource utilization of said data processing, said computer readable program code means comprising:

computer readable program code means for monitoring usage of said random access memory, a portion of said monitoring being performed by a first device driver which computes a non-allocatable working amount of memory for a specific time period and then adds a portion of allocatable memory to said working memory when it is determined that the allocatable memory portion has been accessed by said processor more recently than said working memory;

computer readable program code means for determining, by a second device driver, usage of said at least one peripheral device by computing a ratio of a total number of hardware timer interrupt signal sent to said at least one peripheral device and a number of corresponding signals received from said device indicating that said device is busy;

computer readable program code means for measuring, by a third device driver, activity of said processor by initiating a process with a lowest possible priority on said processor and determining an amount of idle time when said low priority process is executing on said processor;

computer readable program code means for generating, by said data processing system, resource data, indicating usage of said random access memory, said processor and said at least one peripheral device; and computer readable program code means for displaying in real time, by said data processing system, said resource data of said data processing system.

7. The program product of claim 6 wherein said at least one peripheral device is a direct access storage device or a communication adapter.

8. The computer program product of claim 6 wherein said computer readable program code means for displaying in real time, by said data processing system, said resource data of said data processing system, includes:

computer readable program code means for displaying in real time, by said data processing system, said resource data of said data processing system on said at least one peripheral device.

9. The computer program product of claim 6 wherein said at least one peripheral device includes at least one window, and said computer readable program code means for displaying in real time, by said data processing system, said resource data of said data processing system, includes:

computer readable program code means for displaying in real time, by said data processing system, said resource data of said data processing system of said at least one window.

10. The computer program product of claim 6 wherein said computer readable program code means for displaying in real time, by said data processing system, said resource data of said data processing system, includes:

computer readable program code means for displaying in real time, by said data processing system, said resource data of said data processing system on a remote data processing system peripheral device.

11. A computer program product, residing on a computer readable medium, having means for indicating resource utilization of a data processing system, and comprising:

monitor means for monitoring at least one process of said data processing system by said data multiprocessing system;

generator means for generating resource usage data for said at least one process resulting from said monitoring; and display means for displaying in real time said resource usage data of said data processing system.

* * * * *